(12) United States Patent
Mitarai

(10) Patent No.: US 10,580,127 B2
(45) Date of Patent: Mar. 3, 2020

(54) MODEL GENERATION APPARATUS, EVALUATION APPARATUS, MODEL GENERATION METHOD, EVALUATION METHOD, AND STORAGE MEDIUM

(71) Applicant: CANON KABUSHIKI KAISHA, Tokyo (JP)

(72) Inventor: Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 15/882,893

(22) Filed: Jan. 29, 2018

(65) Prior Publication Data

US 2018/0218487 A1  Aug. 2, 2018

(30) Foreign Application Priority Data

Jan. 31, 2017 (JP) .................................. 2017-015590

(51) Int. Cl.

| | |
|---|---|
| *G06T 7/00* | (2017.01) |
| *G06N 5/04* | (2006.01) |
| *G06F 17/16* | (2006.01) |
| *G06N 7/00* | (2006.01) |

(Continued)

(52) U.S. Cl.
CPC .............. *G06T 7/001* (2013.01); *G06F 17/16* (2013.01); *G06N 3/0454* (2013.01); *G06N 5/048* (2013.01); *G06N 7/005* (2013.01); *G06N 20/00* (2019.01); *G06T 2207/10061* (2013.01); *G06T 2207/20076* (2013.01); *G06T 2207/20081* (2013.01); *G06T 2207/30164* (2013.01)

(58) Field of Classification Search
None
See application file for complete search history.

(56) References Cited

U.S. PATENT DOCUMENTS 9,846,826 B2 * 12/2017 Nakamura ......... G06K 15/1872
2018/0149577 A1 * 5/2018 Wang ................. G01N 33/0027
(Continued)

OTHER PUBLICATIONS

Giacomo Boracchi, "Novelty Detection in Images by Sparse Representations", Inteligent Embedded Systems, pp. 47-54, Dec. 2014.
(Continued)

*Primary Examiner* — Iman K Kholdebarin
(74) *Attorney, Agent, or Firm* — Canon U.S.A., Inc. I.P. Division

(57) ABSTRACT

At least one model generation apparatus that generates a model representing a feature of specific data belonging to a specific category includes a selection unit configured to select, based on a degree of conformity between each of a plurality of pieces of specific data belonging to the specific category and each of a plurality of pieces of reference data included in a previously-set reference data group, at least one piece of reference data from the reference data group with respect to each piece of specific data, a parameter specifying unit configured to specify a parameter corresponding to the reference data selected by the selection unit with respect to each of the plurality of pieces of specific data, and a model generation unit configured to generate, as a model of the specific data, a parameter model indicating a distribution of at least one parameter specified by the parameter specifying unit.

29 Claims, 22 Drawing Sheets

(51) Int. Cl.
*G06N 3/04* (2006.01)
*G06N 20/00* (2019.01)

(56) References Cited

U.S. PATENT DOCUMENTS

2019/0073445 A1* 3/2019 Shen ............... G16B 40/20
2019/0293619 A1* 9/2019 Wang ............... G01N 33/0027

OTHER PUBLICATIONS

Michal Aharon, et al.,"K-SVD: An Algorithm for Designing Overcomplete Dictionaries for Sparse Representation", IEEE Trans. on Signal Processing, vol. 54, No. 11, pp. 4311-4322, Oct. 2006.
Pati, et al., "Orthogonal Matching Pursuit: Recursive Function Approximation with Applications to Wavelet Decomposition", the 27th Annual Asilomar Conf. on Signals Systems and Computers, pp. 40-44, Nov. 1993.
Jerome Friedman, et al., "Regularization Paths Generalized Linear Models via Coordinate Descent", Journal of Statistical Software, vol. 33, Issue 1, pp. 1-22, Jan. 2010.
Yusuke Mitarai, et al., "Visual Code-Sentences: A New Video Representation Based on Image Descriptor Sequences", Computer Vision—ECCV 2012. Workshops and Demonstrations, vol. 7583, pp. 321-331, Oct. 2012.
Yoshua Bengio, et al., "Greedy Layer-Wise Training of Deep Networks", Advances in Neural Information Processing Systems 19, pp. 153-160, Dec. 2006.
Alex Krizhevsky, et al., "ImageNet Classification with Deep Convolutional Neural Networks", Advances in Neural Information Processing Systems 25, pp. 1106-1114, Dec. 2012.

* cited by examiner

MODEL GENERATION APPARATUS, EVALUATION APPARATUS, MODEL GENERATION METHOD, EVALUATION METHOD, AND STORAGE MEDIUM

BACKGROUND OF THE INVENTION

Field of the Invention

The present disclosure generally relates to one or more embodiments of a model generation apparatus, an evaluation apparatus, a model generation method, an evaluation method, and a storage medium each of which is configured to evaluate the category of data.

Description of the Related Art

Heretofore, various methods have been proposed as a method for modeling data using a plurality of pieces of data which belongs to a specific category. Some general methods include a method of performing modeling on the premise that the distribution of data is a normal distribution. However, in a case where the distribution of data on which to perform modeling is complicated, there are limitations to such a method of modeling. On the other hand, an anomaly detection method discussed in Giacomo Boracchi, Diego Carrera, and Brendt Wohlberg, "Novelty Detection in Images by Sparse Representations", Intelligent Embedded Systems, pp. 47-54, 2014 (hereinafter referred to as Non-Patent Literature 1) includes a method for detecting anomalies in scanning electron microscope (SEM) images. More specifically, the method uses the technique of sparse coding to convert a great number of image patches obtained by sampling a normal SEM image into models and detects anomalies based on the models. When performing processing for sparse coding on normal image patches, the method models allowable ranges for two variables including a reconstruction error and an L1 norm with an ellipse, thus converting an image patch in the normal SEM image into a model. This enables detecting anomalies based on whether a new input image patch is within the range of the model.

However, the anomaly detection method discussed in Non-Patent Literature 1 consolidates information into two variables including a reconstruction error and an L1 norm, which are obtained during processing for sparse coding. Therefore, detailed information about original data is not represented, and, as a result, it may be impossible to perform sufficient modeling.

SUMMARY OF THE INVENTION

The present disclosure is generally directed to generating a more appropriate model used for evaluating the category of data.

According to one or more embodiments of the present disclosure, a model generation apparatus that generates a model representing a feature of specific data belonging to a specific category includes a selection unit configured to select, based on a degree of conformity between each of a plurality of pieces of specific data belonging to the specific category and each of a plurality of pieces of reference data included in a previously-set reference data group, at least one piece of reference data from the reference data group with respect to each piece of specific data, a parameter specifying unit configured to specify at least one parameter corresponding to the at least one piece of the reference data selected by the selection unit with respect to each of the plurality of pieces of specific data, and a model generation unit configured to generate, as a model of the specific data, a parameter model indicating a distribution of the at least one parameter specified by the parameter specifying unit.

According to other aspects of the present disclosure, one or more additional model generation apparatuses, one or more evaluation apparatuses, one or more model generation methods, one or more evaluation methods, and one or more storage mediums each of which is configured to evaluate the category of data for use therewith are discussed herein. Further features of the present disclosure will become apparent from the following description of exemplary embodiments with reference to the attached drawings.

DESCRIPTION OF THE EMBODIMENTS

Various embodiments, features, and aspects of the present disclosure will be described in detail below with reference to the drawings.

Figure 1:
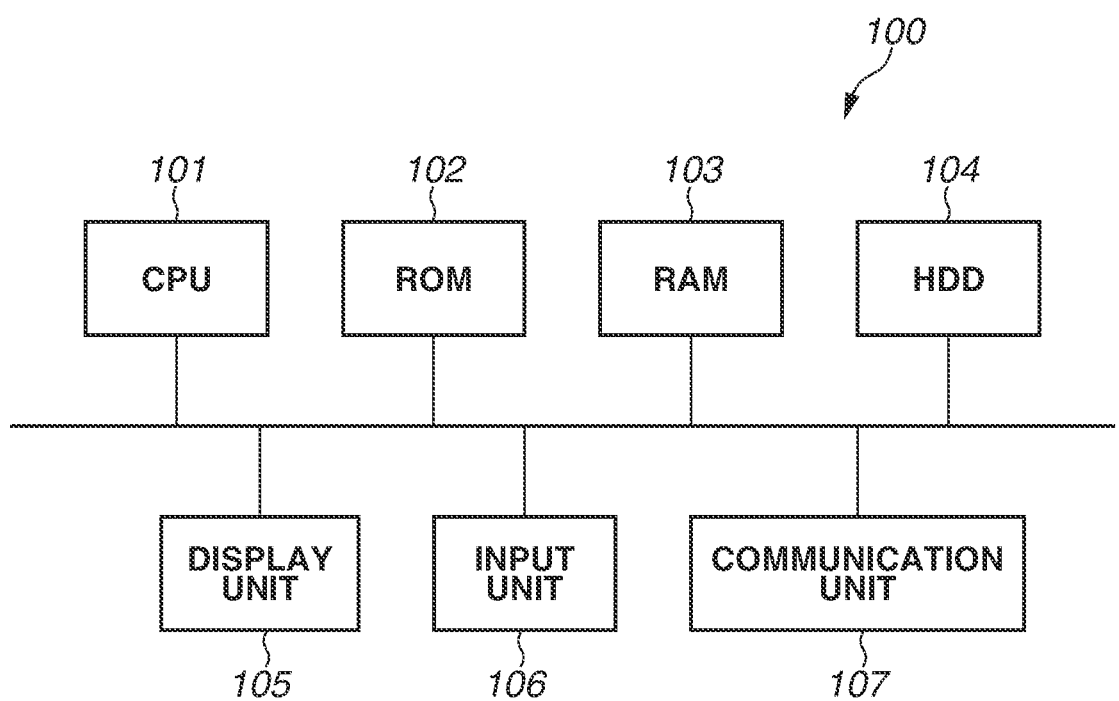
FIG. 1 is a diagram illustrating a hardware configuration of an information processing apparatus according to at least a first embodiment.

FIG. 1 is a diagram illustrating a hardware configuration of an information processing apparatus 100 according to a first exemplary embodiment. The information processing apparatus 100 generates a model of a normal pattern of an object surface, which is used in a system that determines the quality of the surface of an object, which is targeted for surface appearance inspection, based on a captured image of the object. Here, the normal pattern is an example of specific data which is data belonging to a specific category, and the information processing apparatus 100 is an example of a model generation apparatus that generates a model representing a feature of specific data, i.e., a model of specific data. Moreover, the information processing apparatus 100 evaluates the likelihood at which a targeted image belongs to a category of normal pattern, i.e., a specific category, based on a captured image of an object targeted for determination of the quality of an object surface, using the generated model. In other words, the information processing apparatus 100 is an example of an evaluation apparatus that evaluates the likelihood at which data targeted for determination belongs to a specific category, using a model representing a feature of specific data.

Processing performed by the information processing apparatus 100 is divided into two processes, including a model generation process for offline generating a model of a normal pattern of an object and a determination process for online determining the quality of an object surface using the generated model. In the model generation process, the information processing apparatus 100 previously prepares a plurality of objects each known to be a good-quality object, and performs image capturing on each object to acquire a captured image. Hereinafter, the thus-acquired image is referred to as a "normal image". Then, the information processing apparatus 100 clips a great number of local partial images (patches) from a normal image, and generates a model using such a great number of patches. Here, a patch acquired from a normal image is referred to as a "normal patch". In other words, the information processing apparatus 100 performs modeling of data called normal patches using a great number of normal patches.

Moreover, in the determination process, the information processing apparatus 100 performs image capturing on an object targeted for surface appearance inspection to acquire a captured image targeted for determination. Hereinafter, the thus-acquired image is referred to as an "inspection image". Then, the information processing apparatus 100 clips a plurality of local partial images (patches) from an inspection image, and calculates the likelihood of patches based on the model generated in the model generation process. Hereinafter, a patch acquired from an inspection image is referred to as an "inspection patch". The likelihood as calculated here indicates the probability of being normal, and, if the likelihood calculated in a certain inspection patch is low, it can be determined that a portion corresponding to the inspection patch is different from a normal portion, so that the quality of a surface of the target object can be determined. Details of processing in the model generation process and the determination process are described below.

As illustrated in FIG. 1, the information processing apparatus 100 includes a central processing unit (CPU) 101, a read-only memory (ROM) 102, a random access memory (RAM) 103, a hard disk drive (HDD) 104, a display unit 105, an input unit 106, and a communication unit 107. The CPU 101 reads out a program stored in the ROM 102 to perform various processing operations. The RAM 103 is used as a temporary storage region, such as a main memory or a work area, for the CPU 101. The HDD 104 stores, for example, various pieces of data and various programs. Furthermore, functions and processing operations of the information processing apparatus 100 described below are implemented by the CPU 101 reading out a program stored in the ROM 102 or the HDD 104 and executing the program. The display unit 105 displays various pieces of information. The input unit 106, which includes a keyboard and a mouse, receives various operations performed by the user. The communication unit 107 performs processing for communicating with an external apparatus via a network.

Figure 2:
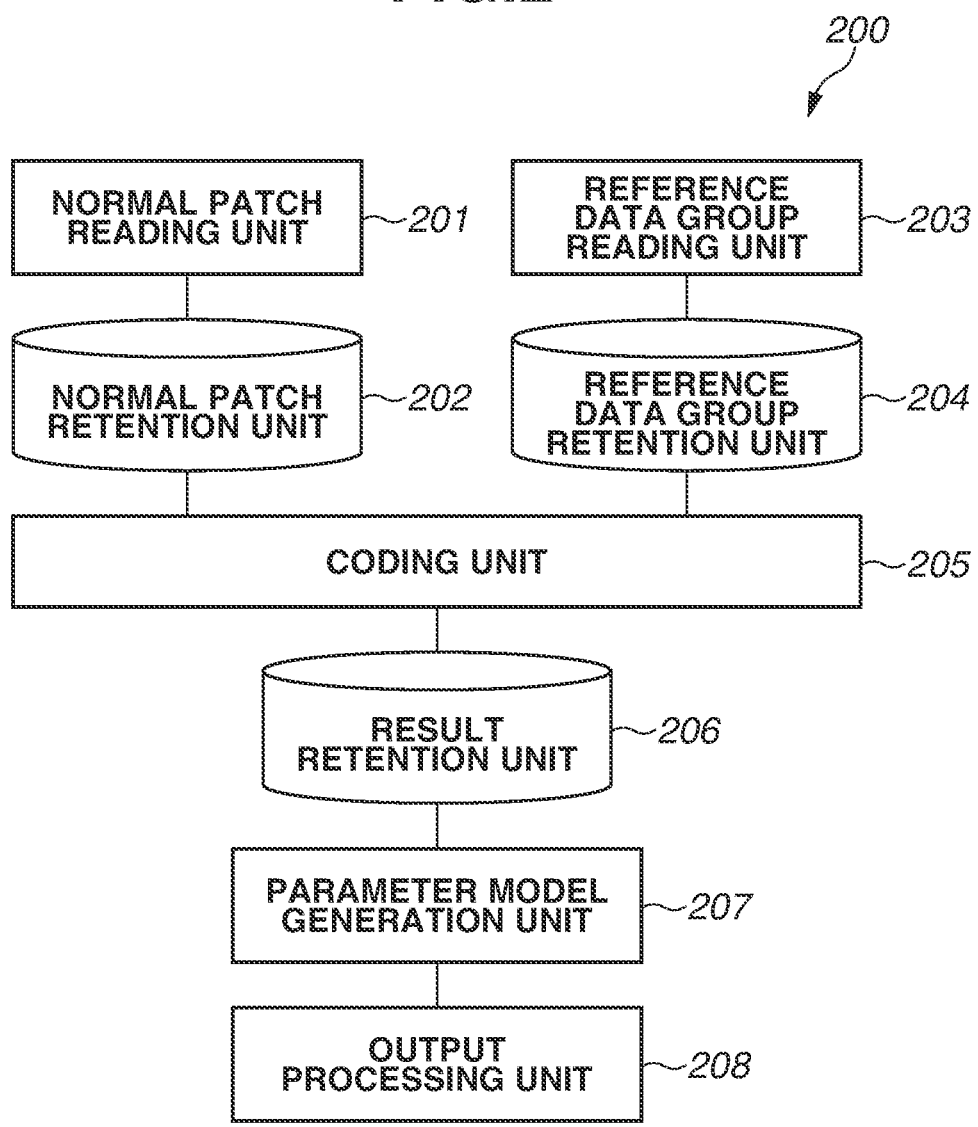
FIG. 2 is a diagram illustrating a software configuration of a processing unit that performs model generation processing.
Figure 3:
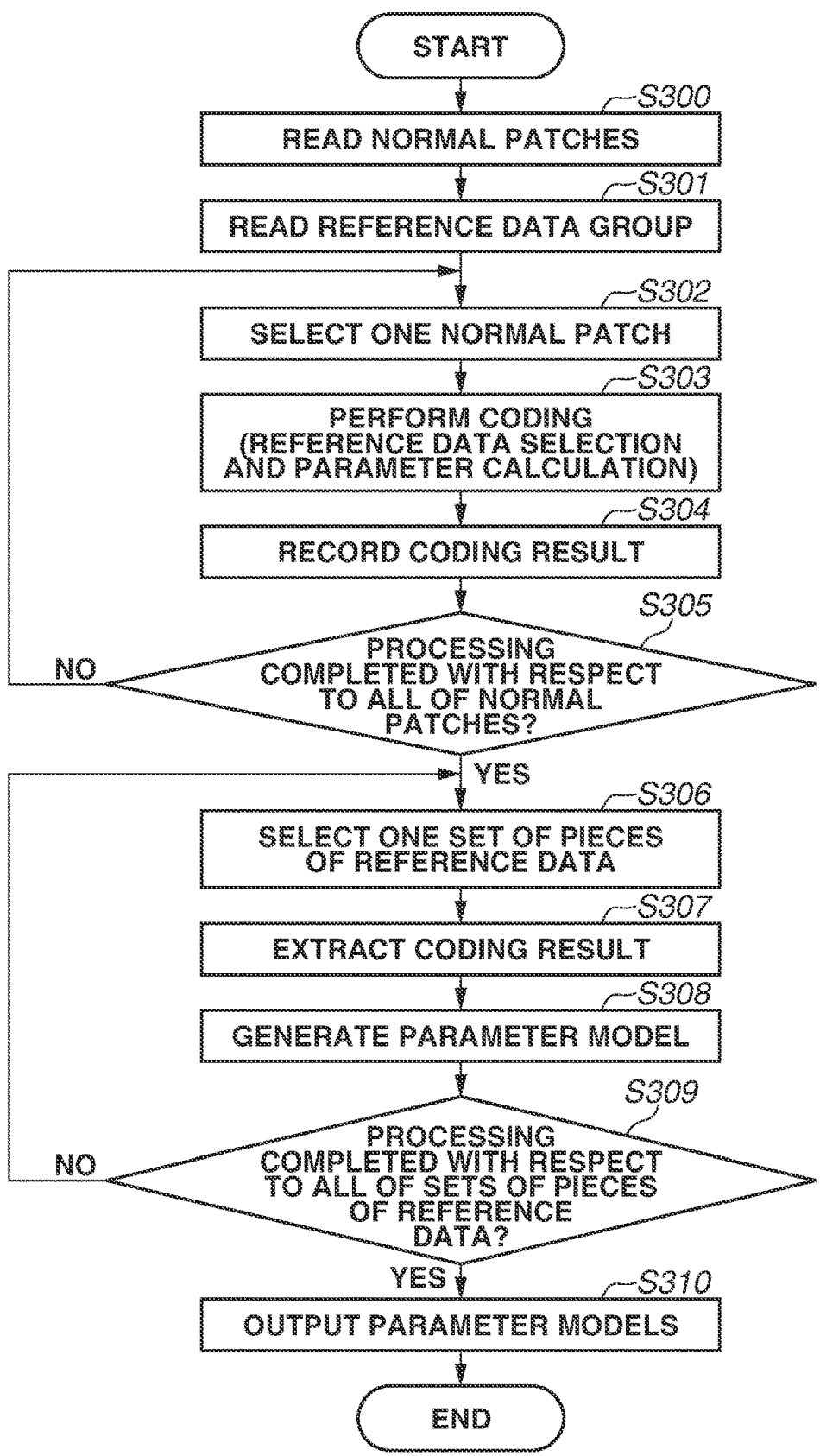
FIG. 3 is a flowchart illustrating at least one embodiment of the model generation processing.

FIG. 2 is a diagram illustrating a software configuration of a processing unit 200, which performs processing (model generation processing) in the model generation process performed by the information processing apparatus 100. FIG. 3 is a flowchart illustrating the model generation processing. As illustrated in FIG. 2, the processing unit 200 includes a normal patch reading unit 201, a normal patch retention unit 202, a reference data group reading unit 203, and a reference data group retention unit 204. The processing unit 200 further includes a coding unit 205, a result retention unit 206, a parameter model generation unit 207, and an output processing unit 208. The function of each unit is also described along with the model generation processing (FIG. 3).

In step S300 illustrated in FIG. 3, the normal patch reading unit 201 acquires a plurality of normal images obtained by performing image capturing on objects known to be good-quality objects. Then, the normal patch reading unit 201 generates a great number of normal patches from each of the normal images. The normal patch reading unit 201 reads all of the generated normal patches into the normal patch retention unit 202. In the present exemplary embodiment, the normal patch reading unit 201 generates normal patches by clipping a great number of partial images with 8×8 pixels from a grayscale image obtained by performing image capturing on the surface of an object, and records the generated normal patches on the normal patch retention unit 202. Furthermore, positions at which to clip partial images as normal patches from a normal image can be optional positions, and the normal patch reading unit 201 can randomly determine positions on a grayscale image and clip partial images at the determined positions. Furthermore, it is desirable that the number of normal patches to be generated be a great number, and the present exemplary embodiment is assumed to generate and record a million normal patches.

Next, in step S301, the reference data group reading unit 203 acquires a reference data group, and reads the reference data group into the reference data group retention unit 204. Here, the reference data group includes a plurality of pieces of reference data. The reference data is data of the format similar to that of data to be converted into a model. In the present exemplary embodiment, the reference data corresponds to data for learning (normal patches), and is, in the present exemplary embodiment, data configured of 8×8 numerical values. The reference data group can be optional data. In the present exemplary embodiment, the reference data group reading unit 203 uses the following dictionary learning technique to previously generate a plurality of pieces of reference data (prototype signal-atoms described in the following literature).

Michal Aharon, Michael Elad, and Alfred Bruckstein, "K-SVD: An Algorithm for Designing Overcomplete Dictionaries for Sparse Representation", IEEE Transactions on Signal Processing, Vol. 54, No. 11, 2006

The reference data group reading unit 203 previously generates a reference data group configured of 256 pieces of reference data according to the above-mentioned technique using data similar to a great number of normal patches generated by the normal patch reading unit 201. More specifically, the reference data group reading unit 203 generates a reference data group in such a manner that the sum of approximation errors occurring due to approximation of linear combination of a plurality of pieces of reference data becomes small. Furthermore, the reference data group reading unit 203 can generate a reference data group by randomly selecting pieces of reference data. Then, the reference data group reading unit 203 records the generated reference data group on the reference data group retention unit 204. Furthermore, it is desirable that the reference data group reading unit 203 use, as normal patches to be used for generation of reference data, normal patches clipped from clipping positions different from those of normal patches acquired by the normal patch reading unit 201. Moreover, for another example, the reference data group reading unit 203 can use normal patches generated by the normal patch reading unit 201.

Next, in step S302, the coding unit 205 selects, as a processing target, one normal patch from among a plurality of normal patches stored in the normal patch retention unit 202. Furthermore, processing in steps S302 to S305 is repetitive processing, and, during repetition, all of the normal patches stored in the normal patch retention unit 202 only need to be selected one by one, so that the order of selection thereof is not specifically limited.

Next, in step S303, the coding unit 205 selects pieces of reference data the number of which is equal to or less than a previously-set number from the reference data group retained in the reference data group retention unit 204 based on the normal patch selected as a processing target. Moreover, the coding unit 205 specifies parameters associated with the respective selected pieces of reference data. Here, the parameter is an evaluation value indicating a degree of conformity between each piece of reference data and each normal patch. The present processing is an example of each of selection processing for selecting reference data, evaluation value specifying processing for specifying an evaluation value, and parameter specifying processing for specifying a parameter. In the present exemplary embodiment, the coding unit 205 uses a method of Orthogonal Matching Pursuit (OMP), which is one of representative sparse coding methods. The following literature can be referred to about OMP.

Y. C. Pati, R. Rezaiifar, and P. S. Krishnaprasad, "Orthogonal Matching Pursuit: Recursive Function Approximation with Applications to Wavelet Decomposition", Asilomar Conference on Signals, Systems and Computers, 1993

The coding unit 205 calculates a suboptimal solution of formula (1) in the processing of OMP.

$$\min_{w} \|x - Bw\|_2^2 \text{ subject to } \|w\|_0 \le \varepsilon \quad (1)$$

In formula (1), x is a column vector of the selected normal patch and, in the present exemplary embodiment, is an 8×8=64-dimensional vector. B is a matrix obtained by arranging a plurality of pieces of reference data retained in the reference data group retention unit 204 as column vectors and, in the present exemplary embodiment, is a matrix with rows and 256 columns. w is a vector obtained by arranging weight coefficients corresponding to the respective pieces of reference data retained in the reference data group retention unit 204 and, in the present exemplary embodiment, is a 256-dimensional vector. Furthermore, $\|\cdot\|_2$ is an L2 norm. $\|\cdot\|_0$ is an L0 norm, in other words, nonzero element count of a vector.

Calculating a suboptimal solution of formula (1) by OMP enables obtaining a weight vector w in which the number of nonzero elements in the elements of the vector w is equal to or less than $\varepsilon$ and Bw is an approximation of x. In the present exemplary embodiment, $\varepsilon=2$ is used to perform the optimization of the above formula, and, as a result, such a solution that only two elements of 256 elements of the vector w become nonzero and the other elements are zero is obtained. Here, reference data corresponding to an element that has been nonzero of the elements of the vector w is considered to be reference data selected from the reference data group. In other words, the coding unit 205 determines which reference data has been selected based on which element of the vector w has been nonzero when the resolution to the vector w is calculated by the processing of OMP in step S303. Then, the coding unit 205 determines the value of an element of the vector w corresponding to the selected reference data, i.e., the weight coefficient calculated with respect to the reference data, as a parameter concerning the selected reference data. Processing in step S303 is an example of processing for performing square error minimization with L0-norm regularization.

Next, in step S304, the coding unit 205 records the reference data selected in step S303 and the value of the element of the vector w corresponding to the selected reference data as a coding result on the result retention unit 206. Thus, the coding result includes a result of selection and a parameter (weight coefficient). In the present exemplary embodiment, since $\varepsilon=2$ is set, two or less pieces of reference data are selected. For example, suppose that the i-th element and j-th element (i<j) of the vector w are nonzero and the value of the i-th element and the value of the j-th element corresponding to those are $w_{(i)}$ and $w_{(j)}$, respectively. In this case, in step S304, the coding unit 205 records a data set (i, j, $w_{(i)}$, $w_{(j)}$), which is obtained by putting together these pieces of information into a set, as a coding result on the result retention unit 206.

Next, in step S305, the coding unit 205 checks whether processing in steps S303 and S304 has been completed with respect to all of the normal patches recorded on the normal patch retention unit 202. If there is any unprocessed normal patch (NO in step S305), the coding unit 205 returns the processing to step S302. In this instance, the coding unit 205 selects an unprocessed normal patch in step S302 and performs processing in step S303 and subsequent steps. If processing in steps S303 and S304 has been completed with respect to all of the normal patches (YES in step S305), the coding unit 205 advances the processing to step S306. When the processing has been completed with respect to all of the normal patches, respective coding results corresponding to all of the normal patches recorded on the normal patch retention unit 202 are recorded on the result retention unit 206.

In step S306, the parameter model generation unit 207 selects one set of pieces of reference data as a processing target according to a previously-set condition. The parameter model generation unit 207 in the present exemplary embodiment selects two pieces of reference data as a set of pieces of reference data from a plurality of pieces of reference data included in the reference data group. Furthermore, processing in steps S306 to S309 is repetitive processing, and, during the repetition processing, the parameter model generation unit 207 selects every combination of two pieces of reference data which is able to be taken from a plurality of pieces of reference data of the reference data group as a set of pieces of reference data. While the order of selection is optional, in the present exemplary embodiment, the parameter model generation unit 207 selects every combination in order in such a way as to first select a set of the first reference data and the second reference data and then select a set of the first reference data and the third reference data.

Next, in step S307, the parameter model generation unit 207 extracts a coding result including a set of pieces of reference data serving as a processing target from the result retention unit 206. For example, suppose that, in step S306, a set of the i-th reference data and the j-th reference data has been selected. In this case, the parameter model generation unit 207 extracts a coding result including the i-th reference data and the j-th reference data from among the coding results recorded on the result retention unit 206. In a case where the number of extracted recording results is N, the parameter model generation unit 207 extracts N coding results expressed in formula (2) from the coding results recorded on the result retention unit 206.

$$(i, j, w_{(i)n}, w_{(j)n}[n=1, 2, \ldots, N] \quad (2)$$

In formula (2), $w_{(i)n}$ and $w_{(j)n}$ are parameters concerning the i-th reference data and the j-th reference data, respectively, in the n-th extracted coding result. The present processing is an example of extraction processing for extracting a selection result including pieces of reference data pertaining to a set of pieces of reference data.

Next, in step S308, the parameter model generation unit 207 generates a model concerning a distribution of two values of each of N coding results $\{w_{(i)n}, w_{(j)n}\}$ extracted in step S307. In other words, the present model is a model indicating a two-dimensional distribution of parameters (weight coefficients) with respect to a set of pieces of reference data including the i-th reference data and the j-th reference data. Hereinafter, the model indicating the distribution of parameters is referred to as a "parameter model". Here, the parameter model is a model of specific data belonging to a specific category, which indicates features of a great number of pieces of data in the specific category, and processing in step S308 is an example of model generation processing. Furthermore, a model indicating a distribution, which serves as the parameter model, only needs to use an optional model adequate to represent the distribution, and includes, for example, a mixture Gaussian distribution model.

In the present exemplary embodiment, the parameter model generation unit 207 does not directly model the distribution of parameters $w_{(i)n}$ and $w_{(j)n}$, but generates a parameter model with the distribution of absolute values of parameters $|w_{(i)n}|$ and $|w_{(j)n}|$ assumed to be a normal distribution. Thus, the parameter model generation unit 207 calculates a vector $w'_{(i,j)n}$ with two values $|w_{(i)n}|$ and $|w_{(j)n}|$ included as a first element and a second element. Then, the parameter model generation unit 207 calculates an average $\mu_{(i,j)}$ and a variance-covariance matrix $\Sigma_{(i,j)}$ of the vector $w'_{(i,j)n}$ as a parameter model according to formula (3) and (4), respectively.

$$\mu_{(i,j)} = \frac{1}{N} \sum_{n=1}^{N} w'_{(i,j)n} \quad (3)$$

$$\Sigma_{(i,j)} = \frac{1}{N-1} \sum_{n=1}^{N} (w'_{(i,j)n} - \mu_{(i,j)})^2 \quad (4)$$

Next, in step S309, the parameter model generation unit 207 checks whether processing in steps S307 and S308 has been completed with respect to all of the sets of pieces of reference data. If there is an unprocessed set of pieces of reference data (NO in step S309), the parameter model generation unit 207 returns the processing to step S306. In this instance, the parameter model generation unit 207 selects an unprocessed set of pieces of reference data in step S306 and performs processing in step S307 and subsequent steps. If processing in steps S307 and S308 has been completed with respect to all of the sets of pieces of reference data (YES in step S309), the parameter model generation unit 207 advances the processing to step S310.

Furthermore, since the number of pieces of reference data included in the reference data group is 256, the number of sets of pieces of reference data is 32,640 ($_{256}C_2$=32,640). Accordingly, the parameter model generation unit 207 repeats processing in steps S306 to S309 to generate 32,640 parameter models as models of specific data.

In step S310, the output processing unit 208 performs control to output all of the parameter models generated in step S308 as models of specific data. In the present exemplary embodiment, the output processing unit 208 performs control to output averages and variance-covariance matrices calculated with respect to all of the sets (32,640 sets) of pieces of reference data as parameter models. Thus, the model generation processing is completed.

In this way, in the model generation process, the information processing apparatus 100 performs sparse coding with respect to each of a great number of normal patches to perform selection of reference data and calculation of parameters (weight coefficients) pertaining to the selected reference data. Then, the information processing apparatus 100 extracts coding results including the selected set of pieces of reference data, and models distributions concerning parameters included in the coding results. In other words, the information processing apparatus 100 first divides a set of normal patches into subsets according to combinations of pieces of reference data and performs modeling on each subset. Therefore, appropriate modeling can be performed even with respect to data having a complicated distribution such as a normal patch. The information processing apparatus 100 according to the present exemplary embodiment is able to generate a more appropriate model.

Figure 4:
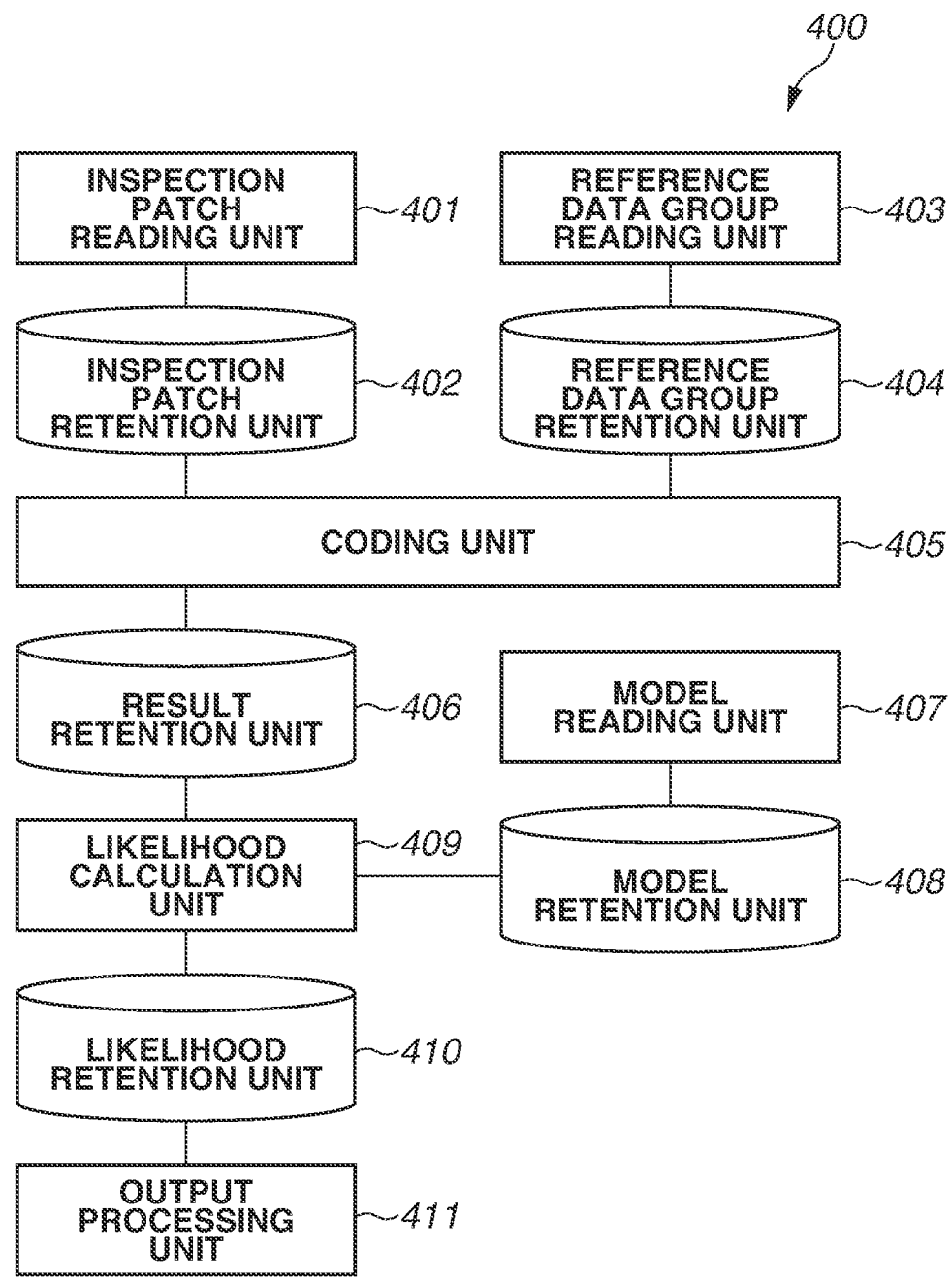
FIG. 4 is a diagram illustrating a processing unit that performs determination processing.
Figure 5:
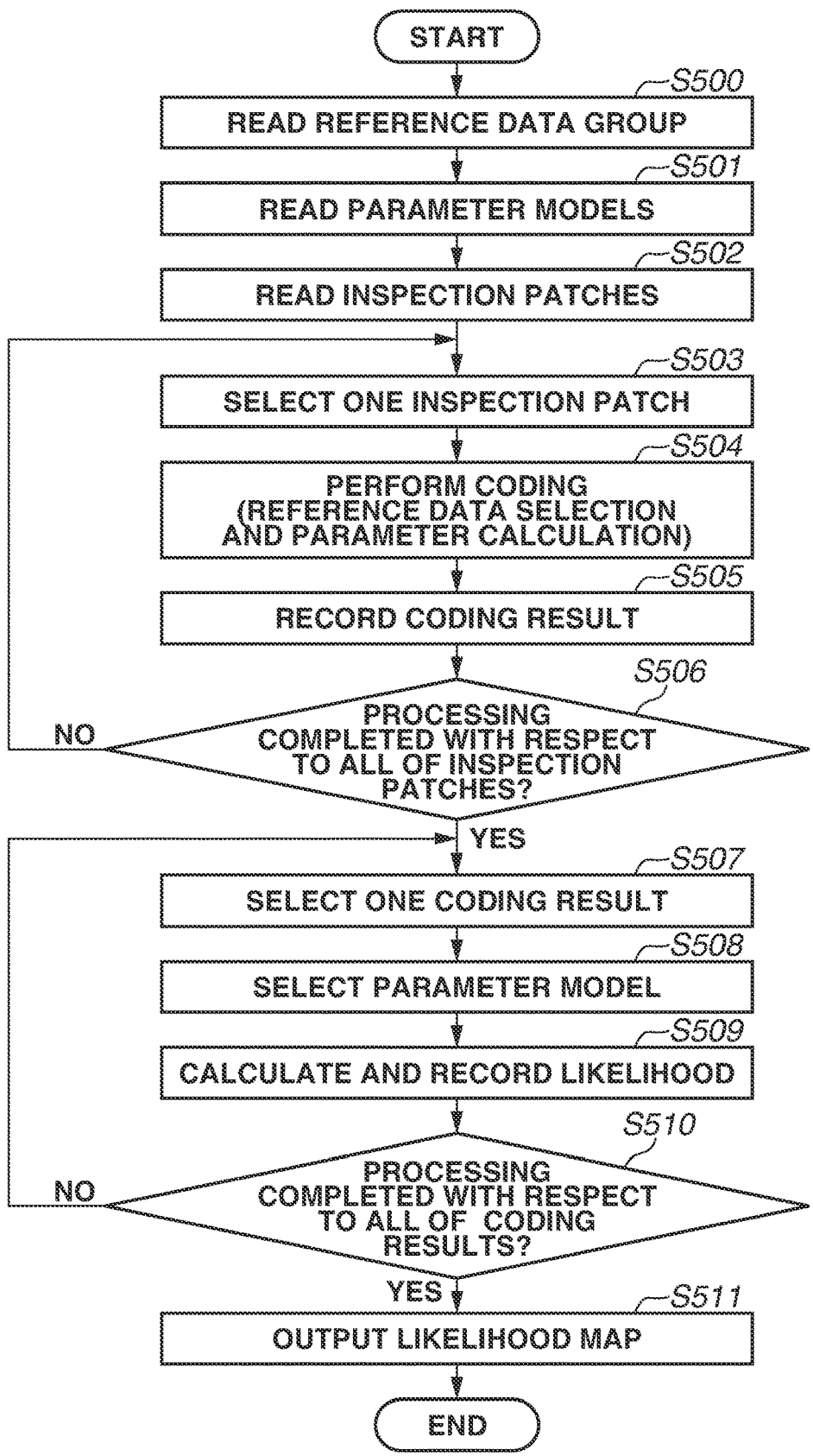
FIG. 5 is a flowchart illustrating at least one embodiment of the determination processing.

Next, processing in the determination process (determination processing) performed by the information processing apparatus 100 is described. FIG. 4 is a diagram illustrating a software configuration of a processing unit 400 for performing determination processing in the information processing apparatus 100. FIG. 5 is a flowchart illustrating the determination processing. As illustrated in FIG. 4, the processing unit 400 includes an inspection patch reading unit 401, an inspection patch retention unit 402, a reference data group reading unit 403, a reference data group retention unit 404, a coding unit 405, and a result retention unit 406. The processing unit 400 further includes a model reading unit 407, a model retention unit 408, a likelihood calculation unit 409, a likelihood retention unit 410, and an output processing unit 411. The function of each unit is also described with reference to FIG. 5.

In step S500 illustrated in FIG. 5, the reference data group reading unit 403 acquires a reference data group, and reads the reference data group into the reference data group retention unit 404. Furthermore, a reference data group which is read into the reference data group retention unit 404 is the same as the reference data group which is read into the reference data group retention unit 204 in step S301 of the model generation processing (FIG. 3). Next, in step S501, the model reading unit 407 reads models of specific data. More specifically, the model reading unit 407 acquires all of the parameter models generated in the model generation processing, and reads these parameter models into the model retention unit 408. As mentioned above, in the present exemplary embodiment, since 32,640 sets, as sets of pieces of reference data, are obtained from 256 pieces of reference data, parameter models (models with a normal distribution) corresponding to all of the sets of pieces of reference data are read into the model retention unit 408.

Next, in step S502, the inspection patch reading unit 401 acquires an inspection image obtained by performing image capturing on the surface of an object which is targeted for determination of the quality thereof. The inspection patch reading unit 401 generates a plurality of inspection patches from the inspection image, and reads the plurality of inspection patches into the inspection patch retention unit 402. Furthermore, while, in step S300 in the model generation processing, partial images are clipped from random positions on a normal image, in step S502 in the determination processing, the inspection patch reading unit 401 performs grid division on the inspection image to generate a great number of inspection patches. Since, in the present exemplary embodiment, partial images with 8×8 pixels are used, for example, in a case where the inspection image has 640×480 pixels, the inspection patch reading unit 401 generates 80×60=4,800 inspection patches, and reads these patches into the inspection patch retention unit 402.

Furthermore, while, in the present exemplary embodiment, the inspection patch reading unit 401 generates inspection patches by clipping partial images with 8×8 pixels without overlapping in the inspection image as described above, the method for generating inspection patches is not limited to that described in the present exemplary embodiment. For another example, the inspection patch reading unit 401 can generate inspection patches in such a manner that, for example, partial images are overlapped in increments of half a partial image.

Subsequent processing in steps S503 to S506 is processing approximately similar to the processing in steps S302 to S305 in the model generation processing. In step S503, the coding unit 405 selects, as a processing target, one inspection patch from among a plurality of inspection patches recorded on the inspection patch retention unit 402. Furthermore, processing in steps S503 to S506 is repetitive processing, and, during repetition, all of the inspection patches recorded on the inspection patch retention unit 402 only need to be selected one by one, so that the order of selection thereof is not specifically limited. In the present exemplary embodiment, since inspection patches are partial images obtained by grid division, the coding unit 405 sequentially selects inspection patches in order from the upper left corner of the inspection image toward the lower right corner of the inspection image in a raster scan manner.

Next, in step S504, the coding unit 405 selects pieces of reference data the number of which is equal to or less than a previously-set number from the reference data group retained in the reference data group retention unit 404 based on the inspection patch selected as a processing target in step S503. Moreover, the coding unit 405 specifies parameters associated with the respective selected pieces of reference data. The value of c to be used in the present processing is assumed to be the same value as the value of c used in step S303 in the model generation processing. In the present exemplary embodiment, since ε=2 is set, two or less pieces of reference data are also selected in step S504, and weight coefficients concerning the respective pieces of reference data, i.e., the values of elements of the vector w corresponding to the respective pieces of reference data, are obtained as parameters pertaining to the respective pieces of reference data. Furthermore, processing for coding in step S504 is similar to the processing for coding in step S303, and is processing to which the method of OMP is applied.

Next, in step S505, the coding unit 405 records the reference data (reference vector) selected in step S504, the element (weight coefficient) of the vector w concerning the selected reference data, and the position of an inspection patch as a coding result on the result retention unit 406. The position of an inspection patch is a position in the inspection image and information indicating from which position the inspection patch has been clipped. The position of an inspection patch is used to output information indicating an inspection patch at which position has what degree of likelihood in processing for likelihood calculation described below. Suppose that an inspection patch clipped from the position (x, y) of an inspection image is selected as a processing target, and the i-th reference data and the j-th reference data (i<j) are selected with respect to the selected inspection patch. Moreover, suppose that weight coefficients (parameters) corresponding to the respective pieces of reference data are $w_{(i)}$ and $w_{(j)}$, respectively. In this instance, the coding unit 405 records a data set (x, y, i, j, $w_{(i)}$, $w_{(j)}$) as a coding result on the result retention unit 406.

Next, in step S506, the coding unit 405 checks whether processing in steps S504 and S505 has been completed with respect to all of the inspection patches recorded on the inspection patch retention unit 402. If there is any unprocessed inspection patch (NO in step S506), the coding unit 405 returns the processing to step S503. In this instance, the coding unit 405 selects an unprocessed inspection patch in step S503 and performs processing in step S504 and subsequent steps. If processing in steps S504 and S505 has been completed with respect to all of the inspection patches (YES in step S506), the coding unit 405 advances the processing to step S507. When the processing has been completed with respect to all of the inspection patches, respective coding results corresponding to all of the inspection patches recorded on the inspection patch retention unit 402 are recorded on the result retention unit 406.

Next, in step S507, the likelihood calculation unit 409 selects, as a processing target, one coding result from the coding results recorded on the result retention unit 406. The order of selection is optional, and, in the present exemplary embodiment, coding results are assumed to be selected in a raster scan manner as in step S503. Next, in step S508, the likelihood calculation unit 409 selects one model from among a plurality of models recorded on the model retention unit 408 based on the coding result selected as a processing target.

Next, in step S509, the likelihood calculation unit 409 calculates a likelihood that an inspection patch corresponding to the coding result selected as a processing target is a normal patch, based on the coding result selected as a processing target in step S507 and the parameter model selected in step S508. The present processing is an example of calculation processing for calculating a likelihood. Furthermore, the likelihood to be calculated here is a "probability of being a normal patch" subjected to modeling using a great number of normal patches in the model generation processing. Then, a target for determination of quality can be evaluated based on the calculated likelihood. Thus, it can be determined that, if the likelihood is low, there is a high possibility of being different from a normal patch.

Here, processing in steps S508 and S509 in a case where the coding result selected as a processing target is (x, y, j, $w_{(i)}$, $w_{(j)}$) is described. In this case, in step S508, the likelihood calculation unit 409 selects a parameter model of the distribution of parameters $w_{(i)}$ and $w_{(j)}$ corresponding to a combination (i, j) of pieces of reference data in the model retention unit 408 based on a combination (i, j) of pieces of reference data. The present processing is an example of selection processing for selecting a parameter model corresponding to target data serving as a processing object.

Subsequently, in step S509, the likelihood calculation unit 409 calculates a likelihood of a coding result with respect to the selected parameter model based on the weight coefficients $w_{(i)}$ and $w_{(j)}$ among the coding result (x, y, i, j, $w_{(i)}$, $w_{(j)}$) selected as a processing target. In the present exemplary embodiment, in the light of performing modeling assuming that the distribution of a two-dimensional vector $w'_{(i, j)}$ having elements $|w_{(i)}|$ and which are the absolute values of the weight coefficients $w_{(i)}$ and $w_{(j)}$, respectively, is a normal distribution, the likelihood calculation unit 409 calculates a likelihood L according to formula (5).

$$L = \frac{1}{2\pi |\Sigma_{(i,j)}|^{1/2}} \exp\left\{-\frac{1}{2}(w'_{(i,j)} - \mu_{(i,j)})^T \Sigma_{(i,j)}^{-1} (w'_{(i,j)} - \mu_{(i,j)})\right\} \quad (5)$$

In formula (5), $\mu_{(i, j)}$ and $\Sigma_{(i, j)}$ are an average and a variance-covariance matrix of the distribution, respectively, and are values calculated in the above-mentioned model generation processing. Moreover, $|\Sigma_{(i, j)}|$ is a determinant of the variance-covariance matrix $\Sigma_{(i, j)}$, $\Sigma_{(i, j)}^{-1}$ is an inverse matrix of the variance-covariance matrix $\Sigma_{(i, j)}$, and T is a transposition of the vector. Then, the likelihood calculation unit 409 combines the calculated likelihood L with the position information (x, y) of the selected inspection patch into a set (x, y, L), and records the set (x, y, L) as likelihood information on the likelihood retention unit 410.

Next, in step S510, the likelihood calculation unit 409 checks whether processing in steps S508 and S509 has been completed with respect to all of the coding results recorded on the result retention unit 406. If there is any unprocessed coding result (NO in step S510), the likelihood calculation unit 409 returns the processing to step S507. In this instance, the likelihood calculation unit 409 selects an unprocessed coding result in step S507 and performs processing in step S508 and subsequent steps. If processing in steps S508 and S509 has been completed with respect to all of the coding results (YES in step S510), the likelihood calculation unit 409 advances the processing to step S511.

In step S511, the output processing unit 411 generates a likelihood map based on the likelihood information recorded on the likelihood retention unit 410, and performs control to output the likelihood map. In the present exemplary embodiment, the output processing unit 411 converts the likelihoods L calculated with respect to the respective inspection patches into pixel values and generates, as the likelihood map, an image in which the pixel values are arranged in the order corresponding to the clipping positions of the inspection patches. Thus, the determination processing is completed.

In the above-described way, in the determination process, the information processing apparatus 100 generates a likelihood map. With this, for example, in a case where the smallest likelihood on the likelihood map is equal to or less than a predetermined threshold value, the information processing apparatus 100 can determine that there is a high possibility that a portion different from being normal is present on the surface of an object corresponding to the inspection patch read by the inspection patch reading unit 401. Thus, as a result, it becomes possible to determine the quality of an object surface. In the above-described way, the information processing apparatus 100 according to the present exemplary embodiment is able to generate a more appropriate model used for evaluating the category of data. Moreover, using the generated model, the information processing apparatus 100 is able to perform the determination of quality (determine whether data belongs to a specific category) with a higher degree of accuracy.

A first modification example of the first exemplary embodiment is described. In the first exemplary embodiment, in the model generation processing, when the distribution of parameters is modeled, the absolute values of the parameters are modeled with a two-dimensional normal distribution. However, values targeted for modeling only need to be values that are based on the parameters, and are not limited to the absolute values of the parameters. For another example, the information processing apparatus 100 can concurrently use a model obtained by modeling of the distribution of non-absolute value parameters as a mixture Gaussian distribution. In this case, the information processing apparatus 100 can perform comprehensive determination based on likelihoods calculated based on the respective models.

Furthermore, for a second modification example, the type of a model is not limited to that described in the present exemplary embodiment. For example, the information processing apparatus 100 can calculate the sum of respective absolute values of a plurality of parameters, such as $|w_{(i)n}|+|w_{(j)n}|$, and can model the sum as a one-dimensional distribution. Moreover, for another example, the information processing apparatus 100 can model a distribution concerning directions of vectors in which a number of parameters corresponding to a number of pieces of reference data of a set of pieces of reference data are arranged, such as arctan $(w_{(i)n}/w_{(j)n})$.

For a third modification example, the value of ε in the sparse coding processing is not limited to ε=2. For another example, the value of ε can be set to ε=1. In this case, the information processing apparatus 100 only needs to generate a one-dimensional parameter model targeted at one piece of reference data. Moreover, for another example, the value of ε can be set to ε=3. In this case, the information processing apparatus 100 only needs to generate a three-or-less dimensional parameter model of three parameters respectively corresponding to three pieces of reference data, which is targeted for a set of three pieces of reference data. Additionally, for another example, in a case where the value of ε is set to ε=3, the information processing apparatus 100 can generate a parameter model targeted for a set of two pieces of reference data.

In this way, the information processing apparatus 100 only needs to generate a distribution model having a dimension of a number equal to or less than the previously-set value of ε based on a set of pieces of reference data including a predetermined number of pieces of reference data the predetermined number being equal to or less than the value of ε. Thus, the relationship between the value of ε, the number of pieces of reference data included in a set of pieces of reference data, and the number of dimension of a distribution model is not limited to that described in the present exemplary embodiment. In other words, the number m of pieces of reference data corresponding to a set of pieces of reference data can be an integer of 2 or more, or can be 1. However, if the dimension of a distribution model is set to a too high dimension, the estimate accuracy of a distribution deteriorates. Accordingly, it is appropriate to set an adequate dimension by, for example, a likelihood cross-validation method according to, for example, the number of pieces of data targeted for modeling.

For a fourth modification example, the method for quality determination in the determination processing is not limited to that described in the present exemplary embodiment. For another example, the information processing apparatus 100 can perform quality determination based on whether the overall average of a likelihood map or the average of a local area is lower than a predetermined threshold value. Furthermore, for another example, the information processing apparatus 100 can comprehensively perform quality determination using a plurality of values, such as the minimum value and average value of likelihood on a likelihood map. Moreover, for another example, the information processing apparatus 100 can calculate a reconstruction error in an inspection patch as with the method discussed in Non-Patent Literature 1, and can comprehensively perform quality determination based on a combination of the calculated reconstruction error and, for example, the minimum value of likelihood.

Furthermore, while, in the present exemplary embodiment, the information processing apparatus 100 performs both the model generation process and the determination process, the model generation process and the determination process can be performed by respective different information processing apparatuses.

Next, with regard to an information processing apparatus 100 according to a second exemplary embodiment, portions different from those in the information processing apparatus 100 according to the first exemplary embodiment are described. For example, depending on inspection images, there may be systematic non-uniformity corresponding to positions in an image in such a manner that, even in a good-quality image, there is a large variation in texture at both ends of the image. With respect to such an inspection image, the information processing apparatus 100 according to the second exemplary embodiment generates a model in consideration of positions in the inspection image and performs quality determination using the generated model.

Figure 6:
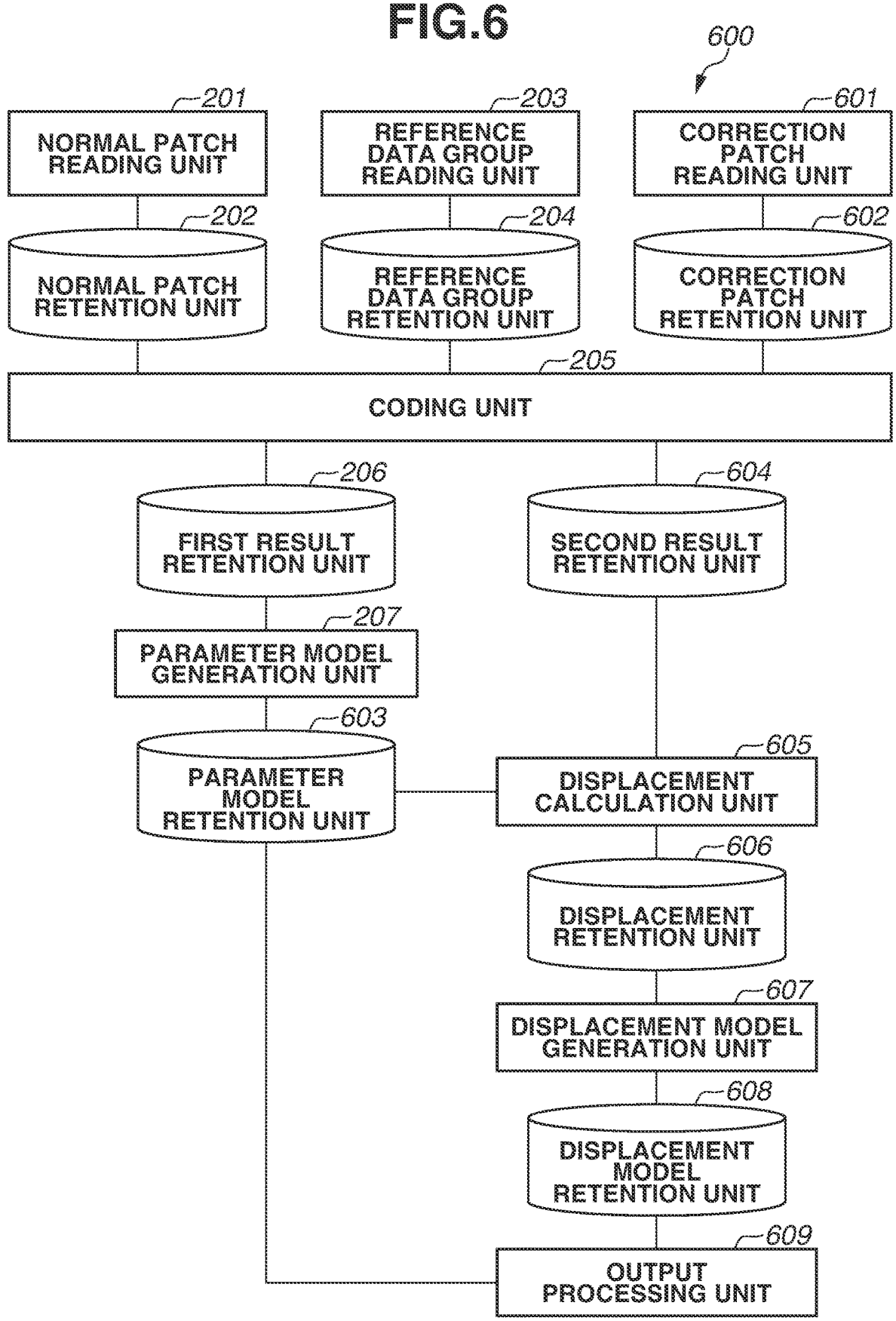
FIG. 6 is a diagram illustrating a processing unit that performs model generation processing according to at least a second embodiment.
Figure 7:
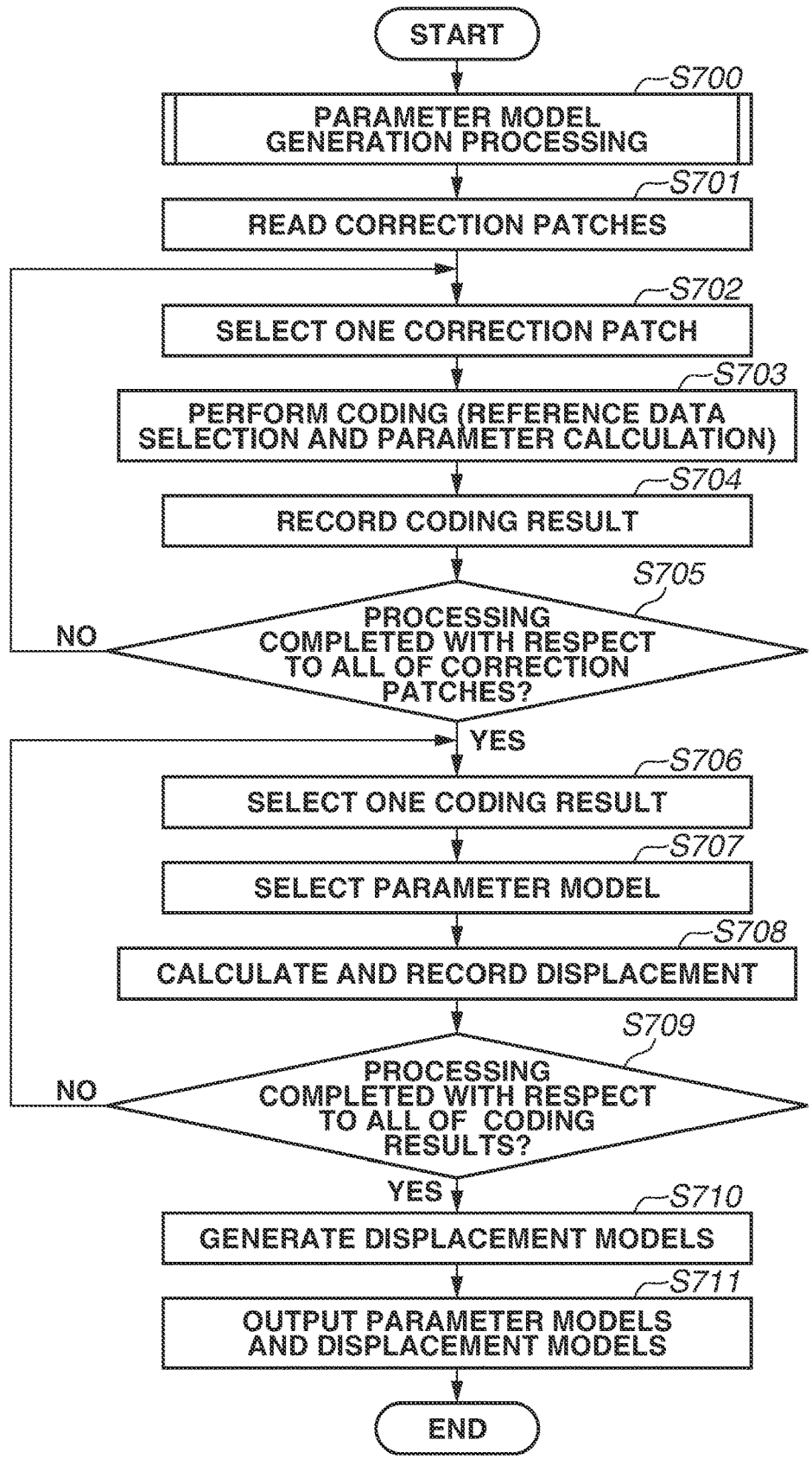
FIG. 7 is a flowchart illustrating the model generation processing according to at least the second embodiment.

Processing performed by the information processing apparatus 100 according to the second exemplary embodiment is also broadly divided into a model generation process and a determination process as with the processing performed by the information processing apparatus 100 according to the first exemplary embodiment. First, model generation processing in the model generation process is described. FIG. 6 is a diagram illustrating a software configuration of a processing unit 600 for performing model generation processing according to the second exemplary embodiment. The same functions as the functions of the processing unit 200 illustrated in FIG. 2 are assigned the respective same reference characters. FIG. 7 is a flowchart illustrating the model generation processing according to the second exemplary embodiment.

As illustrated in FIG. 6, as with the processing unit 200, the processing unit 600 includes a normal patch reading unit 201, a normal patch retention unit 202, a reference data group reading unit 203, a reference data group retention unit 204, and a coding unit 205. The processing unit 600 further includes a first result retention unit 206 and a parameter model generation unit 207. The first result retention unit 206 and the parameter model generation unit 207 are similar to the result retention unit 206 and the parameter model generation unit 207 according to the first exemplary embodiment illustrated in FIG. 2, respectively. The processing unit 600 further includes a correction patch reading unit 601, a correction patch retention unit 602, a parameter model retention unit 603, a second result retention unit 604, a displacement calculation unit 605, and a displacement retention unit 606. The processing unit 600 further includes a displacement model generation unit 607, a displacement model retention unit 608, and an output processing unit 609. The function of each unit is also described with reference to FIG. 7.

In step S700 illustrated in FIG. 7, the information processing apparatus 100 generates a parameter model and records the parameter model on the parameter model retention unit 603. In the present processing, the information processing apparatus 100 performs the processing in steps S300 to S309 in the model generation processing (FIG. 3) described in the first exemplary embodiment to generate a plurality of parameter models corresponding to all of the sets of pieces of reference data obtained in the coding processing. Then, the parameter model generation unit 207 records all of the generated parameter models on the parameter model retention unit 603.

Next, in step S701, the correction patch reading unit 601 reads correction patches. The present processing is processing similar to that in step S502 in the determination processing (FIG. 5) in the first exemplary embodiment. However, a thing targeted for the present processing is a captured image of an object previously known to be a good-quality object. The correction patch reading unit 601 performs grid division on each of, for example, 100 captured images of a good-quality object to generate a great number of patches. Hereinafter, patches generated by the correction patch reading unit 601 are referred to as "correction patches". Then, the correction patch reading unit 601 reads a great number of generated correction patches into the correction patch retention unit 602.

Next, in step S702, the coding unit 205 selects, as a processing target, one correction patch from among a plurality of correction patches recorded on the correction patch retention unit 602. During repetitive processing in steps S702 to S705, all of the correction patches recorded on the correction patch retention unit 602 only need to be selected one by one, so that the order of selection thereof can be optional. Next, in step S703, the coding unit 205 performs processing of sparse coding on the correction patch selected as a processing target. With this, pieces of reference data are selected with respect to correction patches, and parameters corresponding to the respective selected pieces of reference data are specified. Next, in step S704, the coding unit 205 generates a coding result expressed as $(x, y, i, j, w_{(i)}, w_{(j)})$ including information obtained by sparse coding and position information indicating clipping positions, and records the coding result on the second result retention unit 604. The present processing is similar to the processing in steps S303 and S304 in the first exemplary embodiment illustrated in FIG. 3.

Next, in step S705, the coding unit 205 checks whether processing in steps S703 and S704 has been completed with respect to all of the correction patches recorded on the correction patch retention unit 602. If there is any unprocessed correction patch (NO in step S705), the coding unit 205 returns the processing to step S702. In this instance, the coding unit 205 selects an unprocessed correction patch in step S702 and performs processing in step S703 and subsequent steps. If processing in steps S703 and S704 has been completed with respect to all of the correction patches (YES in step S705), the coding unit 205 advances the processing to step S706.

Next, in step S706, the displacement calculation unit 605 selects, as a processing target, one coding result from among a plurality of coding results recorded on the second result retention unit 604. During repetitive processing in steps S706 to S709, all of the coding results recorded on the second result retention unit 604 only need to be selected one by one, so that the order of selection thereof can be optional.

Next, in step S707, the displacement calculation unit 605 selects one parameter model from among a plurality of parameter models recorded on the parameter model retention unit 603 based on the coding result selected as a processing target. The present processing is similar to the processing in step S508 in the first exemplary embodiment illustrated in FIG. 5. Next, in step S708, the displacement calculation unit 605 calculates a displacement of the coding result selected as a processing target relative to the parameter model based on weight coefficients $w_{(i)}$ and $w_{(j)}$ included in the coding result. Here, a displacement relative to the parameter model is, for example, information indicating how the weight coefficients $w_{(i)}$ and $w_{(j)}$ obtained with respect to the correction patch are away from the center of mass of the parameter model. In the present exemplary embodiment, as with the first exemplary embodiment, in the light of using a normal distribution as a model of the distribution of parameters, the displacement calculation unit 605 calculates a displacement d from the center of mass of the normal distribution according to formula (6).

$$d = \Sigma_{(i,j)}^{-1/2}(w'_{(i,j)} - \mu_{(i,j)}) \quad (6)$$

In formula (6), $\Sigma_{(i,j)}$, $w'_{(i,j)}$, and $\mu_{(i,j)}$ are similar to those described in the first exemplary embodiment. Then, the displacement calculation unit 605 combines the calculated displacement d with the position information (x, y) of the coding result into a set (x, y, d), and records the set (x, y, d) as displacement information on the displacement retention unit 606. Furthermore, the processing in step S708 is an example of displacement specifying processing for specifying a displacement.

Next, in step S709, the displacement calculation unit 605 checks whether processing in steps S707 and S708 has been completed with respect to all of the coding results recorded on the second result retention unit 604. If there is any unprocessed coding result (NO in step S709), the displacement calculation unit 605 returns the processing to step S706. In this instance, the displacement calculation unit 605 selects an unprocessed coding result in step S706 and performs processing in step S707 and subsequent steps. If processing in steps S707 and S708 has been completed with respect to all of the coding results (YES in step S709), the displacement calculation unit 605 advances the processing to step S710.

In step S710, the displacement model generation unit 607 classifies a great number of pieces of displacement information recorded on the displacement retention unit 606 by position information about correction patches. In this way, the displacement model generation unit 607 classifies pieces of displacement information about correction patches based on information about an attribute indicating the position of a correction patch (partial image) in the entire image. Thus, the processing in step S710 is an example of classification processing for classifying correction patches, i.e., specific data, into a plurality of groups. Furthermore, the position is an example of an attribute by which specific data is able to be classified. Then, the displacement model generation unit 607 generates a displacement model indicating the distribution of displacements corresponding to respective pieces of position information for each group based on pieces of deviation information classified by position information.

The displacement model generation unit 607 refers to displacement information (x, y, d) recorded on the displacement retention unit 606, and first extracts displacement information concerning the same clipping position (x, y). Then, the displacement model generation unit 607 models the distribution of displacements d included in the extracted displacement information. In the present exemplary embodiment, as mentioned above, since a set of two pieces of reference data is used, the displacement d is expressed as a two-dimensional vector. Therefore, a displacement model to be generated here is a two-dimensional model. In the present exemplary embodiment, the displacement model generation unit 607 also models the distribution of displacements d with a normal distribution.

Here, suppose that M pieces of displacement information having the same clipping position (x, y) are acquired (M being essentially equal to the number of images input by a data input unit (not illustrated)), and the m-th displacement information in the M pieces of displacement information is expressed as $(x, y, d_{(x, y)m})$. Then, the displacement model generation unit 607 calculates an average $\mu_{(x, y)}$ of the displacement and a variance-covariance matrix $\Sigma_{(x, y)}$ of the displacement as a displacement model according to formula (7) and formula (8), respectively.

$$\mu_{(x,y)} = \frac{1}{M}\sum_{m=1}^{M} d_{(x,y)m} \quad (7)$$

$$\Sigma_{(x,y)} = \frac{1}{M-1}\sum_{m=1}^{M} (d_{(x,y)m} - \mu_{(x,y)})^2 \quad (8)$$

Then, the displacement model generation unit 607 calculates the average $\mu_{(x, y)}$ of the displacement and the variance-covariance matrix $\Sigma_{(x, y)}$ of the displacement with respect to all of the clipping positions (x, y), and records the displacement models on the displacement model retention unit 608. In the above-described way, the information processing apparatus 100 according to the second exemplary embodiment generates, as models of specific data, not only a plurality of parameter models but also a plurality of displacement models corresponding to positions in the entire image.

Next, in step S711, the output processing unit 609 performs control to output a plurality of parameter models generated in step S700 and all of the displacement models generated in step S710 as models of specific data. Thus, the model generation processing is completed.

In this way, in the model generation process in the present exemplary embodiment, the information processing apparatus 100 first generates parameter models with respect to parameters w corresponding to respective sets of pieces of reference data, as with the model generation process in the first exemplary embodiment. After that, the information processing apparatus 100 calculates a displacement d of the parameter in each clipping position of the image relative to the corresponding parameter model, and generates a displacement model obtained by modeling the distribution of the displacement d for each clipping position. The displacement model generated here is used in the determination processing described in the following description.

Figure 8:
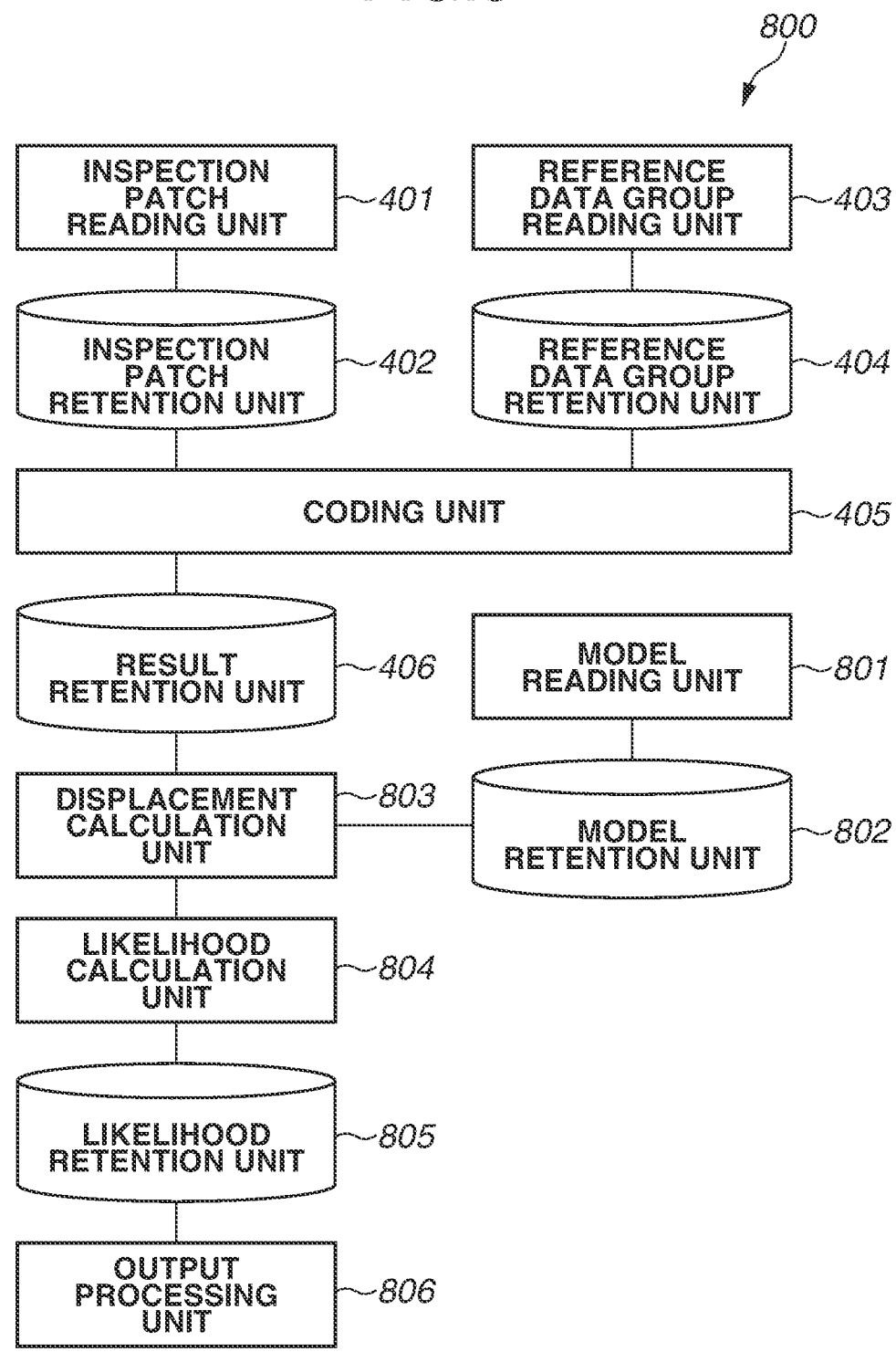
FIG. 8 is a diagram illustrating a processing unit that performs determination processing according to at least the second embodiment.
Figure 9:
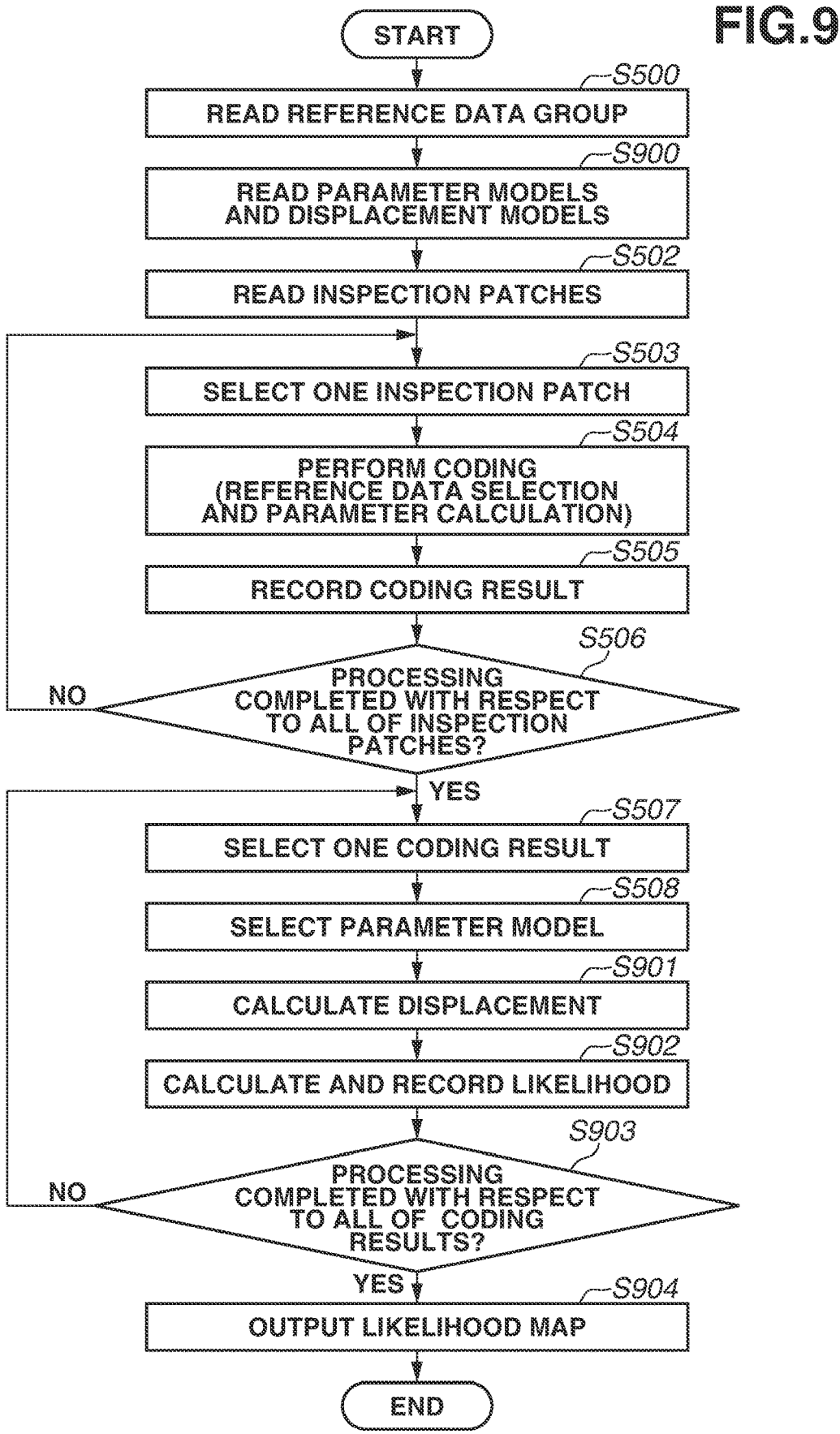
FIG. 9 is a flowchart illustrating the determination processing according to at least the second embodiment.

Next, processing (determination processing) in the determination process in the second exemplary embodiment is described. FIG. 8 is a diagram illustrating a software configuration of a processing unit 800 for performing the determination processing. Out of the functions of the processing unit 800, the same functions as the functions of the processing unit 400 illustrated in FIG. 4 are assigned the respective same reference characters. FIG. 9 is a flowchart illustrating the determination processing according to the second exemplary embodiment. Out of the processing operations included in the determination processing illustrated in FIG. 9, the same processing operations as the processing operations included in the determination processing illustrated in FIG. 5 are assigned the respective same reference characters.

As illustrated in FIG. 8, as with the processing unit 400, the processing unit 800 includes an inspection patch reading unit 401, an inspection patch retention unit 402, a reference data group reading unit 403, a reference data group retention unit 404, a coding unit 405, and a result retention unit 406. The processing unit 800 further includes a model reading unit 801, a model retention unit 802, a displacement calculation unit 803, a likelihood calculation unit 804, a likelihood retention unit 805, and an output processing unit 806. The function of each unit is also described along with the determination processing (FIG. 9).

In the determination processing illustrated in FIG. 9, after processing in step S500, the CPU 101 advances the processing to step S900. In step S900, the model reading unit 801 reads not only weighting models but also displacement models into the model retention unit 802. After processing in step S900, the CPU 101 advances the processing to step S502. Furthermore, after processing in step S508, the CPU 101 advances the processing to step S901. In step S901, the displacement calculation unit 803 calculates a displacement relative to the parameter model selected in step S508 with respect to the coding result selected as a processing target in step S507. Then, the displacement calculation unit 803 sends the calculated displacement together with the position information (x, y) included in the coding result to the likelihood calculation unit 804.

next, in step S902, the likelihood calculation unit 804 selects a displacement model corresponding to the position information about the coding result selected as a processing target from among a plurality of displacement models recorded on the model retention unit 802, based on the position information (x, y). The present processing is an example of group specifying processing for specifying a group to which a coding result of an inspection patch, which is target data as a processing target, belongs, based on an attribute of position. Moreover, the present processing is an example of selection processing for selecting a displacement model corresponding to the group. Then, the likelihood calculation unit 804 calculates a likelihood L' relative to the deviation d calculated in step S901 with respect to the coding result selected as a processing target, based on the selected displacement model. In the present exemplary embodiment, the likelihood calculation unit 804 calculates the likelihood relative to the displacement d according to formula (9).

$$L' = \frac{1}{2\pi |\Sigma_{(x,y)}|^{1/2}} \exp\left\{-\frac{1}{2}(d - \mu_{(x,y)})^T \sum\nolimits_{(x,y)}^{-1} (d - \mu_{(x,y)})\right\} \quad (9)$$

In formula (9), $\mu_{(x, y)}$ and $\Sigma_{(x, y)}$ are the average and the variance-covariance matrix of the distribution of the displacement in the clipping position (x, y), and are values calculated in the above-described model generation processing. Then, the likelihood calculation unit 804 combines the calculated likelihood L' with the position information (x, y) into a set (x, y, L'), and records the set (x, y, L') as likelihood information on the likelihood retention unit 805. With this, it becomes possible to calculate a likelihood with a systematic difference for each clipping position (x, y) corrected.

Next, in step S903, the CPU 101 checks whether processing in steps S508, S901, and S902 has been completed with respect to all of the coding results recorded on the result retention unit 406. If there is any unprocessed coding result (NO in step S903), the CPU 101 returns the processing to step S507. In this instance, the CPU 101 selects an unprocessed coding result in step S507 and performs processing in step S508 and subsequent steps. If processing in steps S508, S901, and S902 has been completed with respect to all of the coding results (YES in step S903), the CPU 101 advances the processing to step S904.

In step S904, the output processing unit 806 generates a likelihood map based on the likelihood information recorded on the likelihood retention unit 805, and performs control to output the likelihood map. In the present exemplary embodiment, the output processing unit 806 converts the likelihoods L' calculated with respect to the respective inspection patches into pixel values and generates, as the likelihood map, an image in which the pixel values are arranged in the order corresponding to the clipping positions of the inspection patches. Thus, the determination processing is completed. The processing in step S904 is similar to the processing in step S511 illustrated in FIG. 5. Furthermore, the configurations and processing operations other than the above-described ones of the information processing apparatus 100 according to the second exemplary embodiment are similar to the configurations and processing operations of the information processing apparatus 100 according to the first exemplary embodiment.

The information processing apparatus 100 according to the second exemplary embodiment uses not only parameter models but also displacement models which depend on positions in an original image of patches used for model generation. With this, the information processing apparatus 100 according to the second exemplary embodiment is able to absorb systematic differences corresponding to positions in an image and to perform quality determination with a high degree of accuracy even when there is systematic non-uniformity in an original image.

Furthermore, while, in the second exemplary embodiment, a case in which such a correction model as to absorb displacements which depend on positions in an original image is used to absorb displacements which depend on positions has been described, the attribute used to calculate systematic displacements is not limited to that described in the present exemplary embodiment. The attribute used to generate a displacement model only needs to be an attribute that is able to be used to classify a plurality of pieces of specific data, and can be, for example, image capturing time.

Next, with regard to an information processing apparatus 100 according to a third exemplary embodiment, portions different from those in the information processing apparatus 100 according to the other exemplary embodiments are described. The information processing apparatus 100 according to the first exemplary embodiment performs selection of reference data with respect to a normal patch or an inspection patch and calculation of parameters (weight coefficients) pertaining to reference data by using processing of sparse coding of L0-norm regularization. On the other hand, the information processing apparatus 100 according to the third exemplary embodiment also uses processing of sparse coding, but uses processing of sparse coding of L1-norm regularization instead of L0-norm regularization.

In the case of L0-norm regularization, setting of the value of ε enables performing control to make the number of pieces of reference data for selection approximately constant. On the other hand, in the case of L1-norm regularization, the number of pieces of reference data for selection varies according to data (patch) targeted for coding processing. To address this issue, the information processing apparatus 100 according to the third exemplary embodiment performs generation of parameter models and quality determination using parameter models in a case where the number of pieces of reference data for selection varies.

Figure 10:
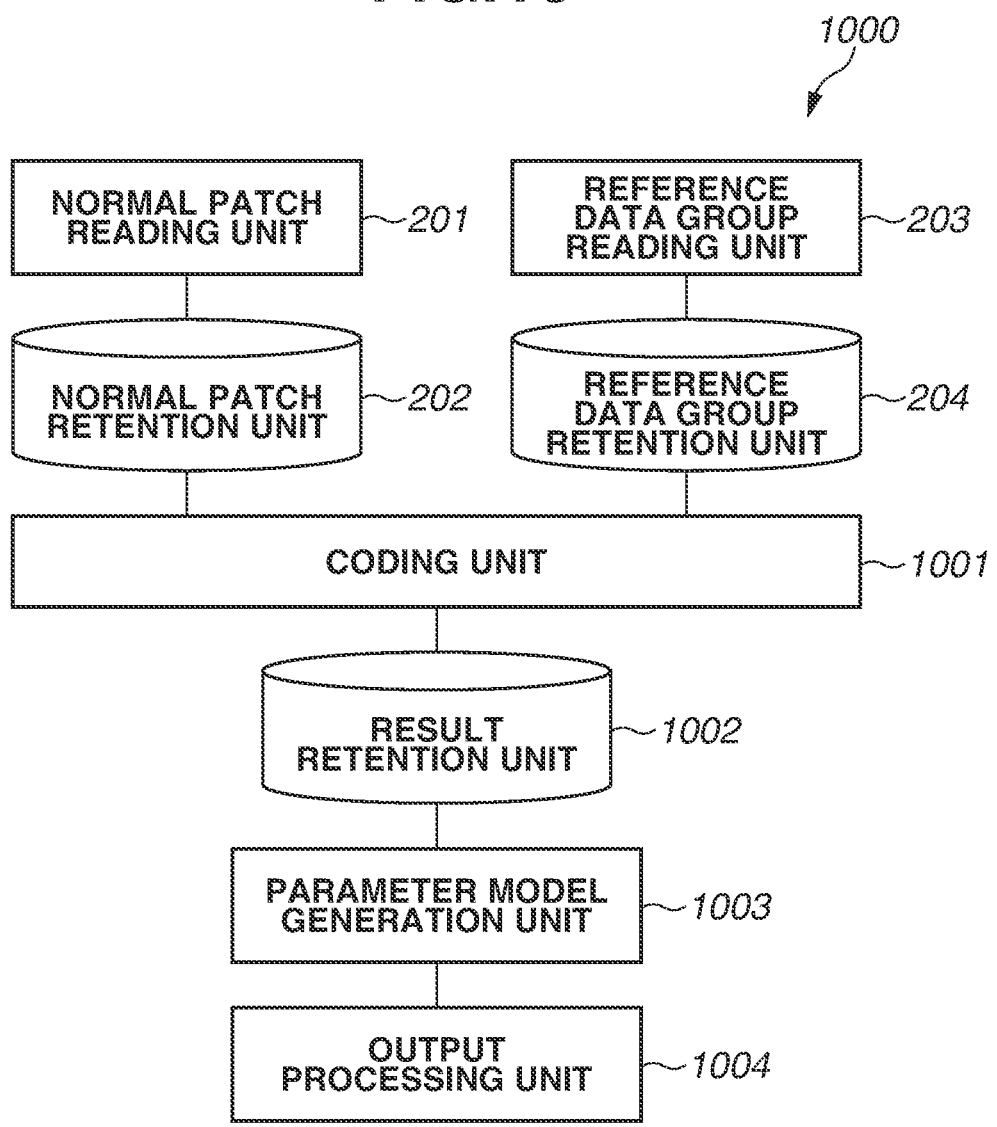
FIG. 10 is a diagram illustrating a processing unit that performs model generation processing according to at least a third embodiment.
Figure 11:
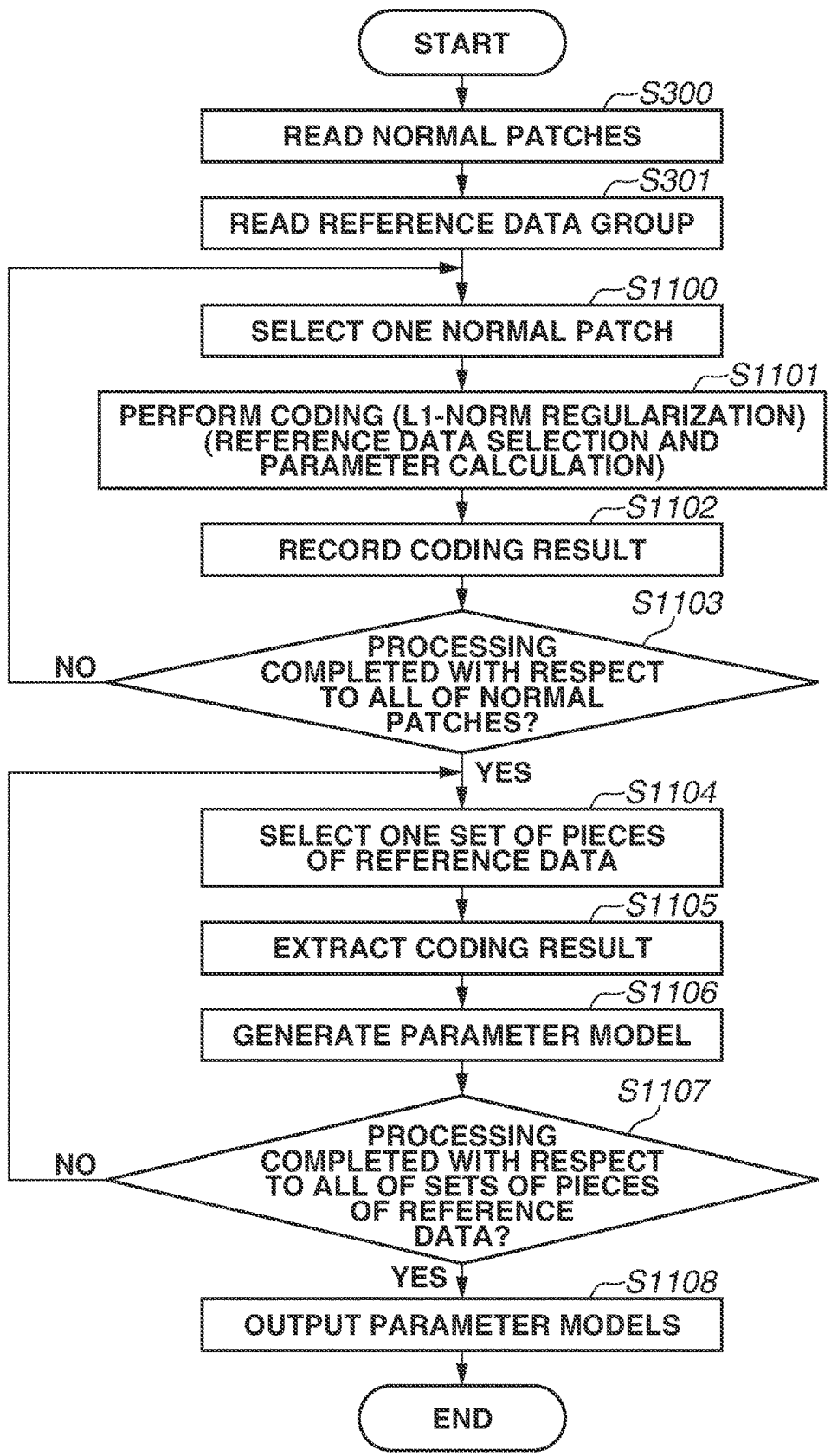
FIG. 11 is a flowchart illustrating the model generation processing according to at least the third embodiment.

Processing performed by the information processing apparatus 100 according to the third exemplary embodiment is also broadly divided into a model generation process and a determination process as with the processing performed by the information processing apparatus 100 according to the other exemplary embodiments. First, model generation processing in the model generation process is described. FIG. 10 is a diagram illustrating a software configuration of a processing unit 1000 for performing model generation processing according to the third exemplary embodiment. The same functions as the functions of the processing unit 200 illustrated in FIG. 2 are assigned the respective same reference characters. FIG. 11 is a flowchart illustrating the model generation processing according to the third exemplary embodiment. The same processing operations as the processing operations included in the model generation processing illustrated in FIG. 3 are assigned the respective same reference characters.

As illustrated in FIG. 10, as with the processing unit 200, the processing unit 1000 includes a normal patch reading unit 201, a normal patch retention unit 202, a reference data group reading unit 203, and a reference data group retention unit 204. The processing unit 1000 further includes a coding unit 1001, a result retention unit 1002, a parameter model generation unit 1003, and an output processing unit 1004. The function of each unit is also described with reference to FIG. 11.

As illustrated in FIG. 11, after processing in step S301, the CPU 101 advances the processing to step S1100. In step S1100, the coding unit 1001 selects one normal patch as a processing target. The present processing is similar to the processing in step S302 illustrated in FIG. 3 in the first exemplary embodiment. Next, in step S1101, the coding unit 1001 performs coding processing to select reference data with respect to the normal patch selected as a processing target and to specify a parameter with respect to the selected reference data. Furthermore, the coding processing performed by the coding unit 1001 in step S1101 is different from the processing performed by the coding unit 205 described in the first exemplary embodiment (processing in step S303).

The coding unit 205 according to the first exemplary embodiment performs processing of sparse coding of L0-norm regularization, as described above. On the other hand, the coding unit 1001 according to the third exemplary embodiment performs processing of sparse coding of L1-norm regularization. More specifically, the coding unit 1001 calculates an optimal solution of formula (10) in the processing of sparse coding of L1-norm regularization.

$$\min_{w} \| x - Bw \|_2^2 + \lambda \| w \|_1 \quad (10)$$

In formula (10), x, B, and w are similar to those described in the first exemplary embodiment, and are a normal patch, a matrix obtained by arranging a plurality of pieces of reference data, and a vector obtained by arranging weight coefficients, respectively. λ is a hyperparameter used to control the intensity of L1-norm regularization, and $\|\cdot\|_1$ is an L1 norm. Generally, the larger value of λ allows for the smaller number of nonzero elements of the weight coefficient w. While there are various proposed solution methods for an optimal solution of formula (10), a coordinate descent algorithm (CDA) described in the following literature is used in the present exemplary embodiment.

Jerome Friedman, Trevor Hastie, and Rob Tibshirani, "Regularization Paths Generalized Linear Models via Coordinate Descent", Journal of Statistical Software, Vol. 33, Issue 1, 2010

Furthermore, the coding unit 1001 can use a previously experimentally determined value as the value of λ. In the present exemplary embodiment, as a result of performing optimization on a great number of normal patches using the above-mentioned CDA, such a value of λ as to obtain about three to four nonzero elements is previously obtained and is then previously stored as the value of λ used in formula (10) in, for example, the HDD 104, and the information processing apparatus 100 can use this value. Here, processing in step S1101 is an example of processing for performing square error minimization with L1-norm regularization.

Next, in step S1102, the coding unit 1001 records the number of pieces of reference data selected in step S1101 (the number of nonzero elements), respective numbers of the selected pieces of reference data, and the elements of w corresponding to the respective selected pieces of reference data as a coding result on the result retention unit 1002. In the present exemplary embodiment, since the number of nonzero elements of w is not constant, the number of pieces of reference data is also added to the coding result in this way. For example, in a case where the i-th element, the j-th element, and the k-th element of w (i<j<k) is nonzero as a result of performing processing of CDA, three pieces, i.e., the i-th, j-th, and k-th pieces, of reference data are selected. Then, the coding unit 1001 records a set (3, i, j, k, $w_{(i)}$, $w_{(j)}$, $w_{(k)}$) as a coding result on the result retention unit 1002.

Next, in step S1103, the coding unit 1001 checks whether processing in steps S1101 and S1102 has been completed with respect to all of the normal patches recorded on the normal patch retention unit 202. If there is any unprocessed normal patch (NO in step S1103), the coding unit 1001 returns the processing to step S1100. In this instance, the coding unit 1001 selects an unprocessed normal patch in step S1100 and performs processing in step S1101 and subsequent steps. If processing in steps S1101 and S1102 has been completed with respect to all of the normal patches (YES in step S1103), the coding unit 1001 advances the processing to step S1104. Furthermore, processing in step S1103 is similar to the processing in step S305 illustrated in FIG. 3.

In step S1104, the parameter model generation unit 1003 selects one set of pieces of reference data including two pieces of reference data. The present processing is similar to the processing in step S306 illustrated in FIG. 3. Next, in step S1105, the parameter model generation unit 1003 extracts a coding result including the set of pieces of reference data selected in step S1104 from the result retention unit 1002. The present processing is partially different from the processing in step S307 illustrated in FIG. 3. For example, suppose that the set of pieces of reference data selected in step S1104 is a set including the i-th reference data and the j-th reference data. In this case, the parameter model generation unit 1003 extracts a coding result in which the i-th reference data and the j-th reference data are included in the pieces of reference data included in the coding result.

In the first exemplary embodiment, a coding result corresponding to the set of pieces of reference data selected in step S306 is extracted. On the other hand, in the present exemplary embodiment, all of the cording results including at least the pieces of reference data included in the set of pieces of reference data selected in step S1104 are extracted. For example, in a case where the i-th reference data and the j-th reference data are selected in step S1104, not only a coding result $(2, i, j, w_{(i)}, w_{(j)})$ but also a coding result $(3, i, j, k, w_{(i)}, w_{(j)}, w_{(k)})$ is extracted.

Next, in step S1106, the parameter model generation unit 1003 uses only parameters corresponding to the set of pieces of reference data selected in step S1104 among the extracted coding results to generate a parameter model corresponding to the set of pieces of reference data. For example, suppose that, as mentioned above, a set of the i-th reference data and the j-th reference data is selected in step S1104 and a coding result $(3, i, j, k, w_{(i)}, w_{(j)}, w_{(k)})$ is extracted. In this case, the parameter model generation unit 1003 uses only parameters $w_{(i)}$ and $w_{(j)}$ among the parameters included in the coding result to generate a two-dimensional parameter model corresponding to the set of the i-th reference data and the j-th reference data. Furthermore, processing for generating a parameter model corresponding to a set of pieces of reference data is similar to the processing for generating a parameter model corresponding to a set of pieces of reference data described in the first exemplary embodiment.

Next, in step S1107, the parameter model generation unit 1003 checks whether processing in steps S1105 and S1106 has been completed with respect to all of the sets of pieces of reference data. If there is an unprocessed set of pieces of reference data (NO in step S1107), the parameter model generation unit 1003 returns the processing to step S1104. In this instance, the parameter model generation unit 1003 selects an unprocessed set of pieces of reference data in step S1104 and performs processing in step S1105 and subsequent steps. If processing in steps S1105 and S1106 has been completed with respect to all of the sets of pieces of reference data (YES in step S1107), the parameter model generation unit 1003 advances the processing to step S1108. In step S1108, the output processing unit 1004 performs control to output all of the parameter models generated in step S1106 as models of specific data. The present processing is similar to the processing in step S310 illustrated in FIG. 3. Thus, the model generation processing according to the third exemplary embodiment is completed.

In this way, even in a case where, in the coding processing, the number of pieces of reference data to be selected is not constant, a model corresponding to a set of a fixed number of pieces of reference data is generated, so that a model having a dimension of a limited number can be generated.

Figure 12:
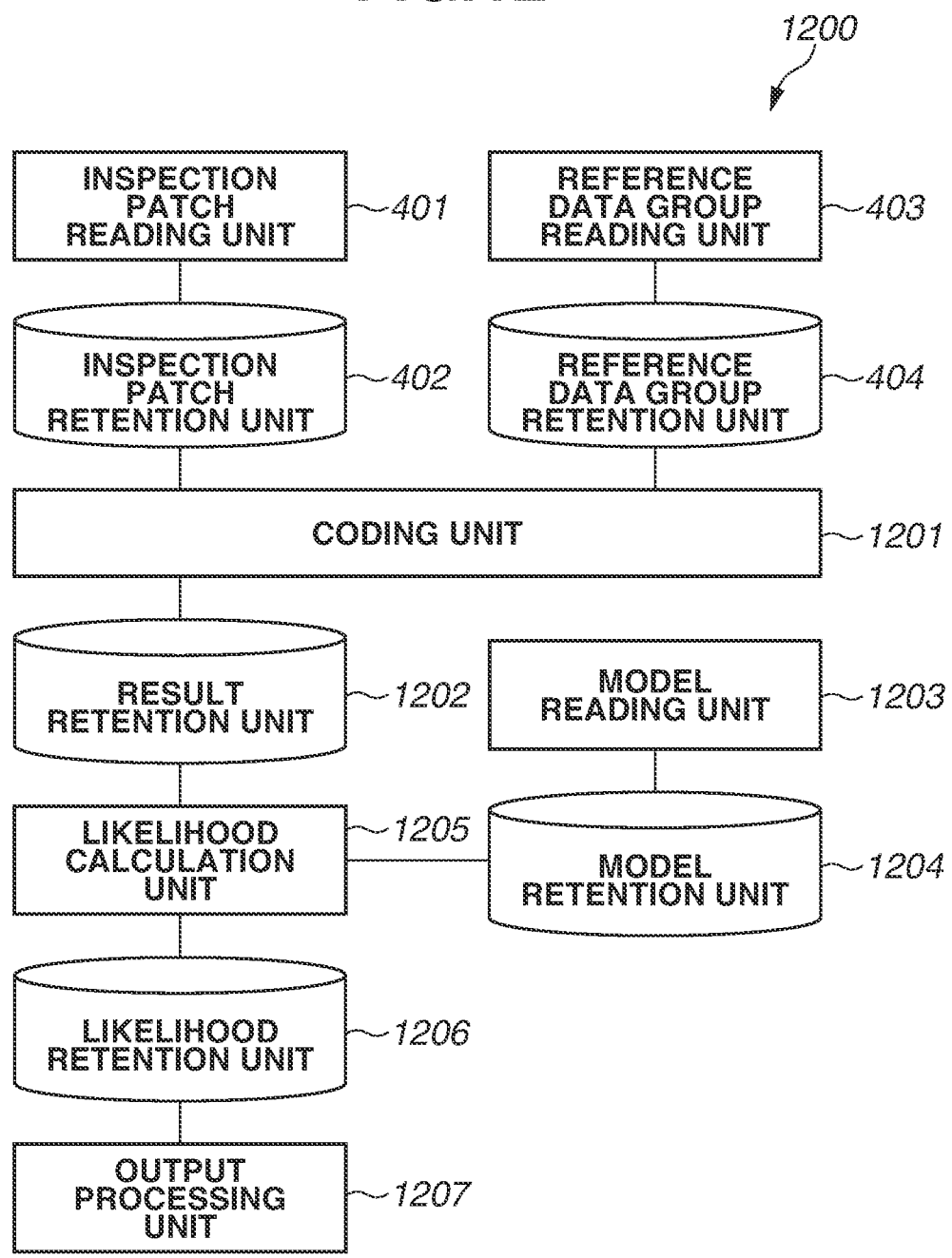
FIG. 12 is a diagram illustrating a processing unit that performs determination processing according to the third embodiment.
Figure 13:
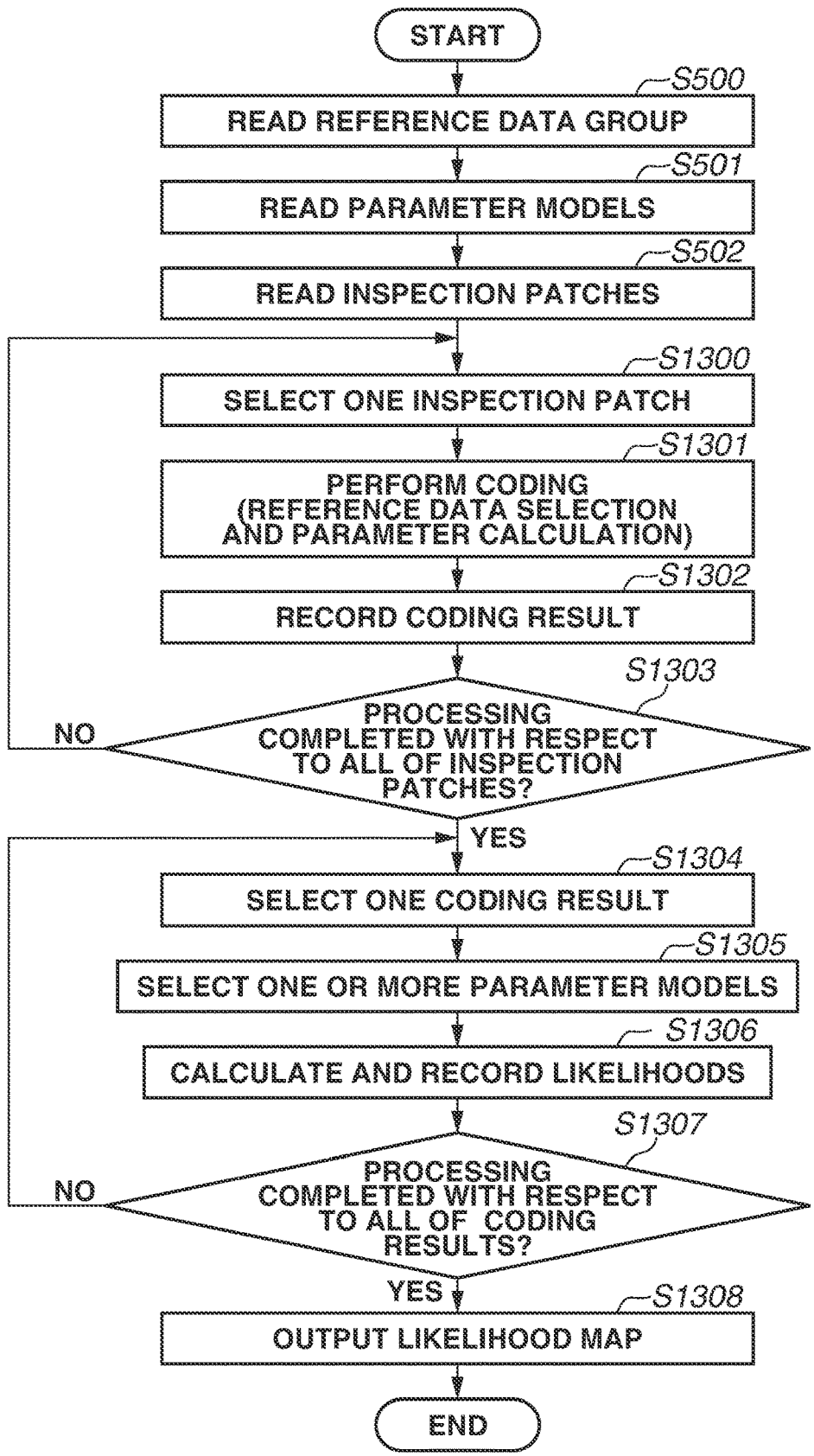
FIG. 13 is a flowchart illustrating the determination processing according to at least the third embodiment.

Next, processing (determination processing) in the determination process in the third exemplary embodiment is described. FIG. 12 is a diagram illustrating a software configuration of a processing unit 1200 for performing the determination processing. Out of the functions of the processing unit 1200, the same functions as the functions of the processing unit 400 illustrated in FIG. 4 are assigned the respective same reference characters. FIG. 13 is a flowchart illustrating the determination processing according to the third exemplary embodiment. Out of the processing operations included in the determination processing illustrated in FIG. 13, the same processing operations as the processing operations included in the determination processing illustrated in FIG. 5 are assigned the respective same reference characters.

As illustrated in FIG. 12, as with the processing unit 400, the processing unit 1200 includes an inspection patch reading unit 401, an inspection patch retention unit 402, a reference data group reading unit 403, and a reference data group retention unit 404. The processing unit 1200 further includes a coding unit 1201 and a result retention unit 1202. The processing unit 1200 further includes a model reading unit 1203, a model retention unit 1204, a likelihood calculation unit 1205, a likelihood retention unit 1206, and an output processing unit 1207. The function of each unit is also described with reference to FIG. 13.

As illustrated in FIG. 13, after processing in step S502, the CPU 101 advances the processing to step S1300. In step S1300, the coding unit 1201 selects one inspection patch as a processing target. The present processing is similar to the processing in step S503 illustrated in FIG. 5 described in the first exemplary embodiment. Next, in step S1301, the coding unit 1201 performs coding processing to select reference data corresponding to the inspection patch selected as a processing target and to specify a parameter corresponding to the selected reference data. The coding processing performed by the coding unit 1201 in step S1301 is coding processing using CDA which is similar to the coding processing performed by the coding unit 1001 in step S1101 illustrated in FIG. 11. Furthermore, processing in step S1301 is processing different from the processing performed by the coding unit 405 described in the first exemplary embodiment (processing in step S504).

Next, in step S1302, the coding unit 1201 records a coding result with respect to the inspection patch selected as a processing target on the result retention unit 1202. Here, the coding result includes position information about the inspection patch selected as a processing target, the number of pieces of reference data selected in step S1301, respective numbers of the selected pieces of reference data, and elements of w corresponding to the respective pieces of reference data. For example, suppose that the clipping position of the inspection patch selected as a processing target is (x, y), the i-th, j-th, and k-th pieces of reference data are selected by the coding processing, and parameters (weight coefficients) corresponding to the respective pieces of reference data are $w_{(i)}$, $w_{(j)}$, and $w_{(k)}$. In this case, the coding unit 1201 records a set $(x, y, 3, i, j, k, w_{(i)}, w_{(j)}, w_{(k)})$ as a coding result on the result retention unit 1202. The present processing corresponds to the processing in step S505 illustrated in FIG. 5.

Next, in step S1303, the coding unit 1201 checks whether processing in steps S1301 and S1302 has been completed with respect to all of the inspection patches recorded on the inspection patch retention unit 402. If there is any unprocessed inspection patch (NO in step S1303), the coding unit 1201 returns the processing to step S1300. In this instance, the coding unit 1201 selects an unprocessed inspection patch in step S1300 and performs processing in step S1301 and subsequent steps. If processing in steps S1301 and S1302 has been completed with respect to all of the inspection patches (YES in step S1303), the coding unit 1201 advances the processing to step S1304.

Next, in step S1304, the likelihood calculation unit 1205 selects one coding result as a processing target from among a plurality of coding results recorded on the result retention unit 1202. The present processing is similar to the processing in step S507 illustrated in FIG. 5. Next, in step S1305, the likelihood calculation unit 1205 selects one or more parameter models. The present processing corresponds to the processing in step S508 illustrated in FIG. 5, but, while one parameter model is selected in step S508, the number of parameter models to be selected in step S1305 is one or more. In this respect, both processing operations are different.

In step S1305, the likelihood calculation unit 1205 obtains every combination of two pieces of reference data in pieces of reference data included in the set of pieces of reference data included in the coding result selected as a processing target, and selects parameter models corresponding to all of the combinations. For example, suppose that the coding result selected as a processing target is (x, y, 3, i, j, k, $w_{(i)}$, $w_{(j)}$, $w_{(k)}$). In this case, since two pieces of reference data are to be selected from three pieces of reference data, $_3C_2=3$ combinations of pieces of reference data, i.e., combinations of pieces of reference data (i, j), (i, k), and (j, k), are obtained. Accordingly, the likelihood calculation unit 1205 selects three parameter models corresponding to these three combinations.

Next, in step S1306, the likelihood calculation unit 1205 calculates likelihoods between parameters included in the coding result selected as a processing result and the selected parameter models. Then, the likelihood calculation unit 1205 integrates the likelihoods about the respective parameter models to obtain a final likelihood with respect to the inspection patch. For example, suppose that, as mentioned above, the coding result of the inspection patch selected as a processing target is (x, y, 3, i, j, k, $w_{(i)}$, $w_{(j)}$, $w_{(k)}$). In this case, the likelihood calculation unit 1205 calculates a likelihood between a parameter model corresponding to a combination (i, j) of pieces of reference data and parameters ($w_{(i)}$, $w_{(j)}$) included in the coding result selected as a processing target and corresponding to the parameter model. The likelihood calculation unit 1205 also calculates a likelihood between a parameter model corresponding to a combination (i, k) of pieces of reference data and parameters ($w_{(i)}$, $w_{(k)}$) corresponding to the parameter model. The likelihood calculation unit 1205 also calculates a likelihood between a parameter model corresponding to a combination (j, k) of pieces of reference data and parameters ($w_{(j)}$, $w_{(k)}$) corresponding to the parameter model. Then, the likelihood calculation unit 1205 integrates the values of three calculated likelihoods and sets the integrated value as a final likelihood with respect to the coding result selected as processing target (the corresponding inspection patch).

In the present exemplary embodiment, the likelihood calculation unit 1205 integrates a plurality of likelihoods by calculating an arithmetic mean. However, the integration method is not limited to that described in the present exemplary embodiment. For another example, a geometric mean can be calculated. Furthermore, processing for calculating a likelihood with respect to a parameter model is similar to the processing described in the other exemplary embodiments. Then, the likelihood calculation unit 1205 combines the integrated likelihood L with the position information (x, y) about the inspection patch into a set (x, y, L), and records the set (x, y, L) as likelihood information on the likelihood retention unit 1206.

Next, in step S1307, the likelihood calculation unit 1205 checks whether processing in steps S1305 and S1306 has been completed with respect to all of the coding results recorded on the result retention unit 1202. If there is any unprocessed coding result (NO in step S1307), the likelihood calculation unit 1205 returns the processing to step S1304. In this instance, the likelihood calculation unit 1205 selects an unprocessed coding result in step S1304 and performs processing in step S1305 and subsequent steps. If processing in steps S1305 and S1306 has been completed with respect to all of the coding results (YES in step S1307), the likelihood calculation unit 1205 advances the processing to step S1308.

In step S1308, the output processing unit 1207 generates a likelihood map based on the likelihood information recorded on the likelihood retention unit 1206, and performs control to output the likelihood map. The present processing is similar to the processing in step S511 illustrated in FIG. 5. Thus, the determination processing is completed. Furthermore, the configurations and processing operations other than the above-described ones of the information processing apparatus 100 according to the third exemplary embodiment are similar to the configurations and processing operations of the information processing apparatus 100 according to the other exemplary embodiments.

As described above, the information processing apparatus 100 according to the third exemplary embodiment is able to generate an appropriate model and to perform determination using the model even in a case where the number of pieces of reference data is not fixed. Furthermore, the information processing apparatus 100 is not limited to the one which selects a previously-determined number of pieces of reference data as described in the first exemplary embodiment, but can also be applied to a case where the number of pieces of reference data is not fixed, as described in the third exemplary embodiment.

For a first modification example of the third exemplary embodiment, in the model generation processing, the number of dimension of a model to be generated is not limited to that described in the present exemplary embodiment, and the information processing apparatus 100 can generate a one-dimensional or three-or-more-dimensional model. However, since, if the dimension is set to a high dimension, the accuracy of modeling deteriorates, it is appropriate to select an appropriate combination number by, for example, a likelihood cross-validation method according to, for example, the number of pieces of data targeted for modeling. Moreover, parameters targeted for modeling are not limited to those described in the present exemplary embodiment, and parameters other than the absolute values of weight coefficients can be used.

Furthermore, for a second modification example, as described in the second exemplary embodiment, the information processing apparatus 100 according to the third exemplary embodiment can not only use models of weight coefficients but also concurrently use models of distributions of displacements corresponding to positions.

Next, with regard to an information processing apparatus 100 according to a fourth exemplary embodiment, portions different from those in the information processing apparatus 100 according to the other exemplary embodiments are described. The information processing apparatus 100 according to the fourth exemplary embodiment generates a model for a specific scene used to determine whether a moving image captured by, for example, a video camera is a specific scene, and determines whether the moving image targeted for determination is the specific scene using the generated model.

Processing performed by the information processing apparatus 100 according to the fourth exemplary embodiment is also broadly divided into a model generation process and a determination process as with the processing performed by the information processing apparatus 100 according to the first exemplary embodiment. The model generation process in the present exemplary embodiment models a specific scene by using a great number of moving images of the specific scene. Moreover, the determination process determines whether a moving image targeted for determination is a specific scene. More specifically, the specific scene is an example of specific data belonging to a specific category. The specific scene includes, for example, a goal scene during a soccer game and an accident scene in a monitoring camera video image, and can be any scene as long as it has a number of pieces of data sufficient to generate a model (for example, 100 or more pieces of data). The information processing apparatus 100 uses this model to calculate a likelihood with respect to an input moving image and determines whether the moving image is a specific scene.

Figure 14:
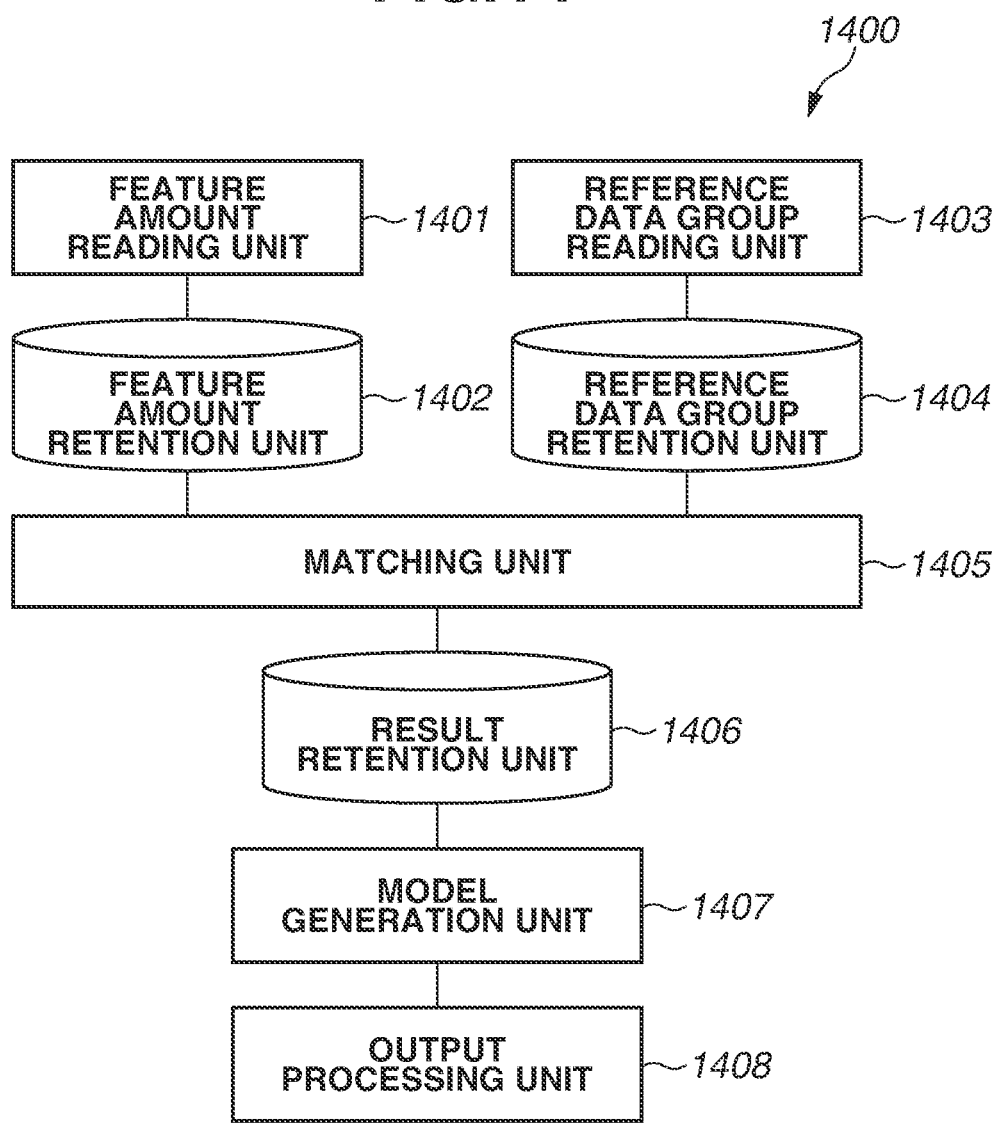
FIG. 14 is a diagram illustrating a processing unit that performs model generation processing according to at least a fourth embodiment.
Figure 15:
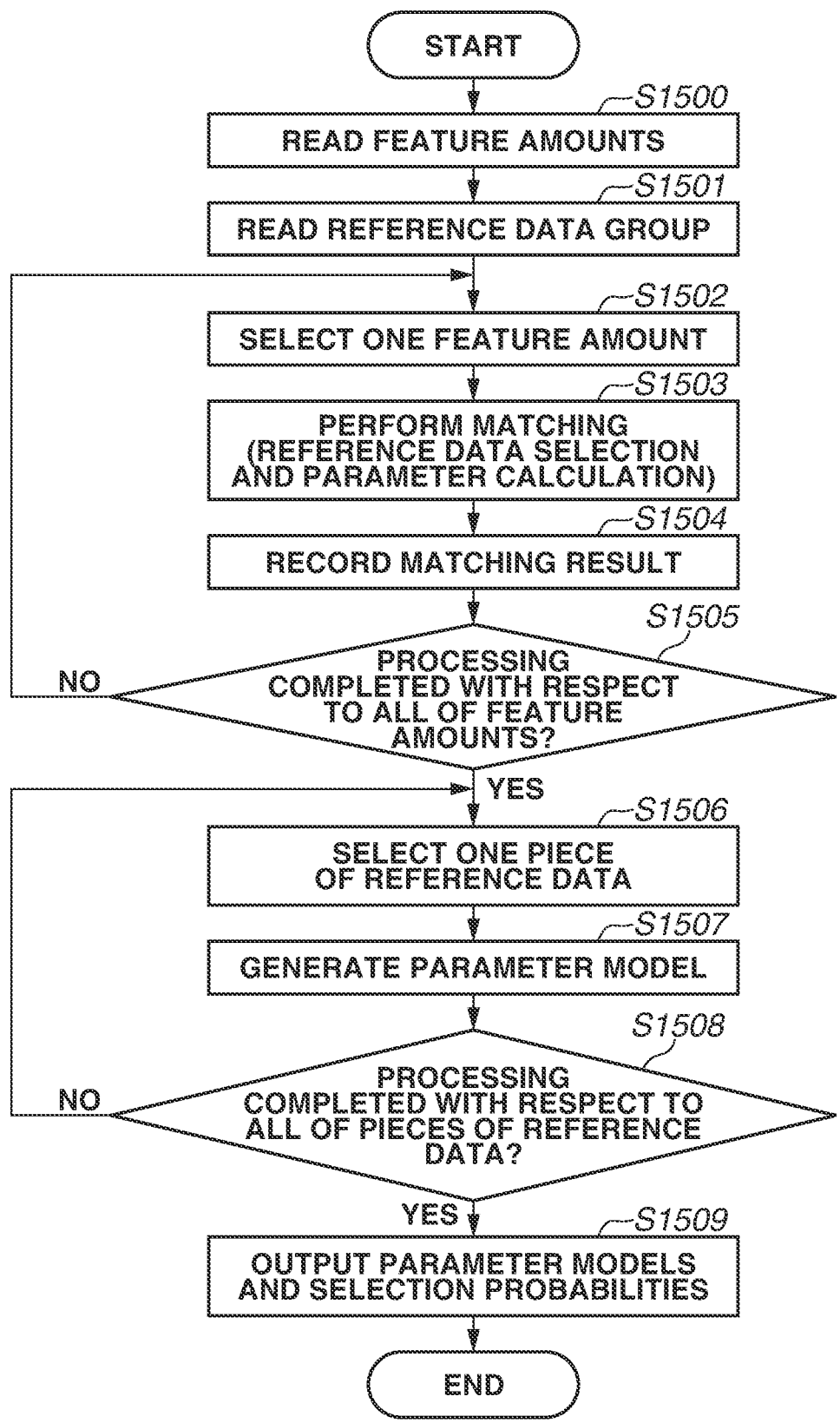
FIG. 15 is a flowchart illustrating the model generation processing according to at least the fourth embodiment.

FIG. 14 is a diagram illustrating a software configuration of a processing unit 1400 for performing model generation processing according to the fourth exemplary embodiment. FIG. 15 is a flowchart illustrating the model generation processing according to the fourth exemplary embodiment. As illustrated in FIG. 14, the processing unit 1400 includes a feature amount reading unit 1401, a feature amount retention unit 1402, a reference data group reading unit 1403, a reference data group retention unit 1404, and a matching unit 1405. The processing unit 1400 further includes a result retention unit 1406, a model generation unit 1407, and an output processing unit 1408. The matching unit 1405, which corresponds to a coding unit in the other exemplary embodiments, performs selection of reference data and calculation of parameters pertaining to the selected reference data. However, the matching unit 1405 differs from the corresponding ones in the other exemplary embodiments in the method for selecting reference data or the method for calculating parameters. The function of each unit is also described with reference to FIG. 15.

As illustrated in FIG. 15, in step S1500, the feature amount reading unit 1401 acquires a great number of pieces of moving image data of a scene to be modeled. Then, the feature amount reading unit 1401 extracts feature amounts from the respective moving images, and records the feature amounts on the feature amount retention unit 1402. In the present exemplary embodiment, the feature amount reading unit 1401 uses a great number of moving images of a specific scene, such as a goal scene during a soccer game, and extracts feature amounts from the respective moving images. While the feature amount to be extracted can be any one as long as it represents the content of a moving image, in the present exemplary embodiment, the feature amount reading unit 1401 extracts a visual code-sentences feature (VCS feature) described in the following literature from a moving image.

Yusuke Mitarai and Masakazu Matsugu, "Visual Code-Sentences: A New Video Representation Based on Image Descriptor Sequences", Computer Vision—ECCV 2012. Workshops and Demonstrations, Vol. 7583, 2012

The VCS feature is a histogram-based feature. In the present exemplary embodiment, as described in the above literature, the feature amount reading unit 1401 uses a histogram having five feature types and 2,000 bins for each feature type, extracts histogram features for 10,000 bins, which are obtained by coupling them, and records the extracted feature amounts on the feature amount retention unit 1402.

Next, in step S1501, as in the other exemplary embodiments, the reference data group reading unit 1403 acquires a reference data group, which includes a plurality of pieces of reference data, and reads the reference data group into the reference data group retention unit 1404. Since, in the present exemplary embodiment, data to be modeled is a histogram for 10,000 bins, reference data as used herein is assumed to be data of the format similar to that of a histogram for 10,000 bins. Each piece of reference data of the reference data group can be any data, but, in the present exemplary embodiment, is randomly-generated histogram data for 10,000 bins. The number of pieces of reference data can also be any number, but, in the present exemplary embodiment, 30 pieces of reference data are previously generated in a random manner and the reference data group reading unit 1403 records these pieces of reference data as a reference data group on the reference data group retention unit 1404.

Next, in step S1502, the matching unit 1405 selects one VCS feature as a processing target from among a plurality of VCS features recorded on the feature amount retention unit 1402. The present processing is similar to the processing for selecting a normal patch in step S302 illustrated in FIG. 3, and, during repetitive processing in steps S1502 to S1505, the matching unit 1405 selects all of the VCS features recorded on the feature amount retention unit 1402 in an optional order.

Next, in step S1503, the matching unit 1405 performs selection of reference data corresponding to the VCS feature selected as a processing target and calculation of parameters. The matching unit 1405 first calculates similarities S between all of the pieces of reference data recorded on the reference data group retention unit 1404 and the VCS feature selected as a processing target according to formula (11).

$$S = \exp\left[-\sum_{f=1}^{5}\sum_{b=1}^{2000} \frac{(h_{(f)}[b] - b_{(f)}[b])^2}{h_{(f)}[b] - b_{(f)}[b]}\right] \quad (11)$$

In formula (11), $h_{(f)}[b]$ is the value of the b-th bin of a histogram of the f-th feature type in the VCS feature selected as a processing target. Similarly, $b_{(f)}[b]$ is the value of the b-th bin of a histogram of the f-th feature type in reference data subjected to calculation of a similarity. This formula calculates an exponential function (exp) with the sign of what is called the $\chi^2$ (chi-squared) distance inverted.

The matching unit 1405 calculates similarities between the VCS feature selected as a processing target and all of the pieces of reference data recorded on the reference data group retention unit 1404, and performs selection of reference data according to the calculated similarities. While various methods are considered as the method for selecting reference data according to the calculated similarities, in the present exemplary embodiment, the matching unit 1405 simply selects one piece of reference data the similarity about which is largest. Then, the matching unit 1405 determines the similarity S calculated with respect to the selected reference data as one of parameters corresponding to the selected reference data.

The matching unit 1405 further calculates a histogram correlation value C as another parameter corresponding to the selected reference data according to formula (12) using the selected reference data and the VCS feature selected as a processing target.

$$C = \sum_{f=1}^{5} \sum_{b=1}^{2000} h_{(f)}[b] \cdot b_{(f)}[b] \quad (12)$$

Next, in step S1504, the matching unit 1405 records a number of the reference data selected in step S1503 and the similarity S and the correlation value C about the selected reference data on the result retention unit 1406. For example, suppose that, in step S1503, the i-th reference data is selected and the corresponding similarity and correlation value are $S_{(i)}$ and $C_{(i)}$, respectively. In this case, the matching unit 1405 records a data set (i, $S_{(i)}$, $C_{(i)}$) as a matching result on the result retention unit 1406.

Next, in step S1505, the matching unit 1405 checks whether processing in steps S1503 and S1504 has been completed with respect to all of the VCS features recorded on the feature amount retention unit 1402. If there is any unprocessed VCS feature (NO in step S1505), the matching unit 1405 returns the processing to step S1502. In this instance, the matching unit 1405 selects an unprocessed VCS feature in step S1502 and performs processing in step S1503 and subsequent steps. If processing in steps S1503 and S1504 has been completed with respect to all of the VCS features (YES in step S1505), the matching unit 1405 advances the processing to step S1506.

Subsequent processing in steps S1506 to S1508 is processing for generating a model concerning a specific scene based on a matching result with respect to each VCS feature recorded on the feature amount retention unit 1402. Here, as in the other exemplary embodiments, this processing generates a parameter model concerning reference data, and, in addition, also models the probability that each piece of reference data is selected. In step S1506, the model generation unit 1407 selects one piece of reference data as a processing target from among the pieces of reference data recorded on the reference data group retention unit 1404. During repetitive processing in steps S1506 to S1508, the model generation unit 1407 selects all of the pieces of reference data recorded on the reference data group retention unit 1404 in an optional order. In the present exemplary embodiment, the model generation unit 1407 is assumed to perform selection in order from the first reference data.

Next, in step S1507, the model generation unit 1407 generates a parameter model indicating the distribution of parameters with respect to the reference data selected as a processing target. More specifically, the model generation unit 1407 first extracts a matching result including the reference data selected as a processing target from the matching results recorded on the result retention unit 1406.

For example, suppose that the reference data selected as a processing target is the i-th reference data. In this case, the model generation unit 1407 extracts a matching result including the i-th reference data as the selected reference data from the result retention unit 1406.

In a case where the number of extracted results is N, N matching results expressed as (i, $S_{(i)n}$, $C_{(i)n}$) [n=1, 2, ..., N] are extracted from the matching results recorded on the result retention unit 1406. Here, $S_{(i)n}$ and $C_{(i)n}$ are a similarity and a correlation value about the i-th reference data in the result extracted at the n-th time, respectively. Then, the model generation unit 1407 uses the parameters ($S_{(i)n}$, $C_{(i)n}$) among the N extracted matching results to perform processing for generating a model concerning the distribution of these two values.

While the model concerning the distribution to be generated here can be any model, in the present exemplary embodiment, the model generation unit 1407 generates a model on the assumption that the distribution is a two-dimensional normal distribution. The model generation unit 1407 calculates an average $\mu_{(i)}$ and a variance-covariance matrix $\Sigma_{(i)}$ according to formula (13) and formula (14). A two-dimensional vector obtained by arranging two values of the parameters ($S_{(i)n}$, $C_{(i)n}$) is denoted by $z_{(i)n}$.

$$\mu_{(i)} = \frac{1}{N} \sum_{n=1}^{N} z_{(i)n} \quad (13)$$

$$\Sigma_{(i)} = \frac{1}{N-1} \sum_{n=1}^{N} (z_{(i)n} - \mu_{(i)})^2 \quad (14)$$

Moreover, besides the above-mentioned parameter model, the model generation unit 1407 also models the probability of selection of the reference data selected as a processing target. More specifically, with regard to the model generation unit 1407, suppose that the number of all of the matching results recorded on the result retention unit 1406 is T and, of these, N (N<T) matching results include the reference data selected as a processing target. In this case, the model generation unit 1407 estimates that the probability of selection of the reference data selected as a processing target is N/T.

Next, in step S1508, the model generation unit 1407 checks whether processing in step S1507 has been completed with respect to all of the pieces of reference data recorded on the reference data group retention unit 1404. If there is unprocessed reference data (NO in step S1508), the model generation unit 1407 returns the processing to step S1506. In this instance, the model generation unit 1407 selects unprocessed reference data in step S1506 and performs processing in step S1507. If processing in step S1507 has been completed with respect to all of the pieces of reference data (YES in step S1508), the model generation unit 1407 advances the processing to step S1509. With this, parameter models and selection probabilities are obtained with respect to all of the pieces of reference data. In this way, the information processing apparatus 100 according to the present exemplary embodiment generates, as models of a specific scene, a plurality of parameter models and a plurality of selection probabilities.

Next, in step S1509, the output processing unit 1408 performs control to output, as models of a specific scene, the parameter models and the selection probabilities obtained in step S1507 with respect to all of the pieces of reference data.

In the present exemplary embodiment, since 30 pieces of reference data are used, 30 parameter models and 30 selection probabilities are output. Thus, the model generation processing is completed. As described above, in the model generation process, the information processing apparatus 100 according to the fourth exemplary embodiment uses respective feature amounts extracted from a great number of pieces of data to perform modeling of the extracted feature amounts.

Figure 16:
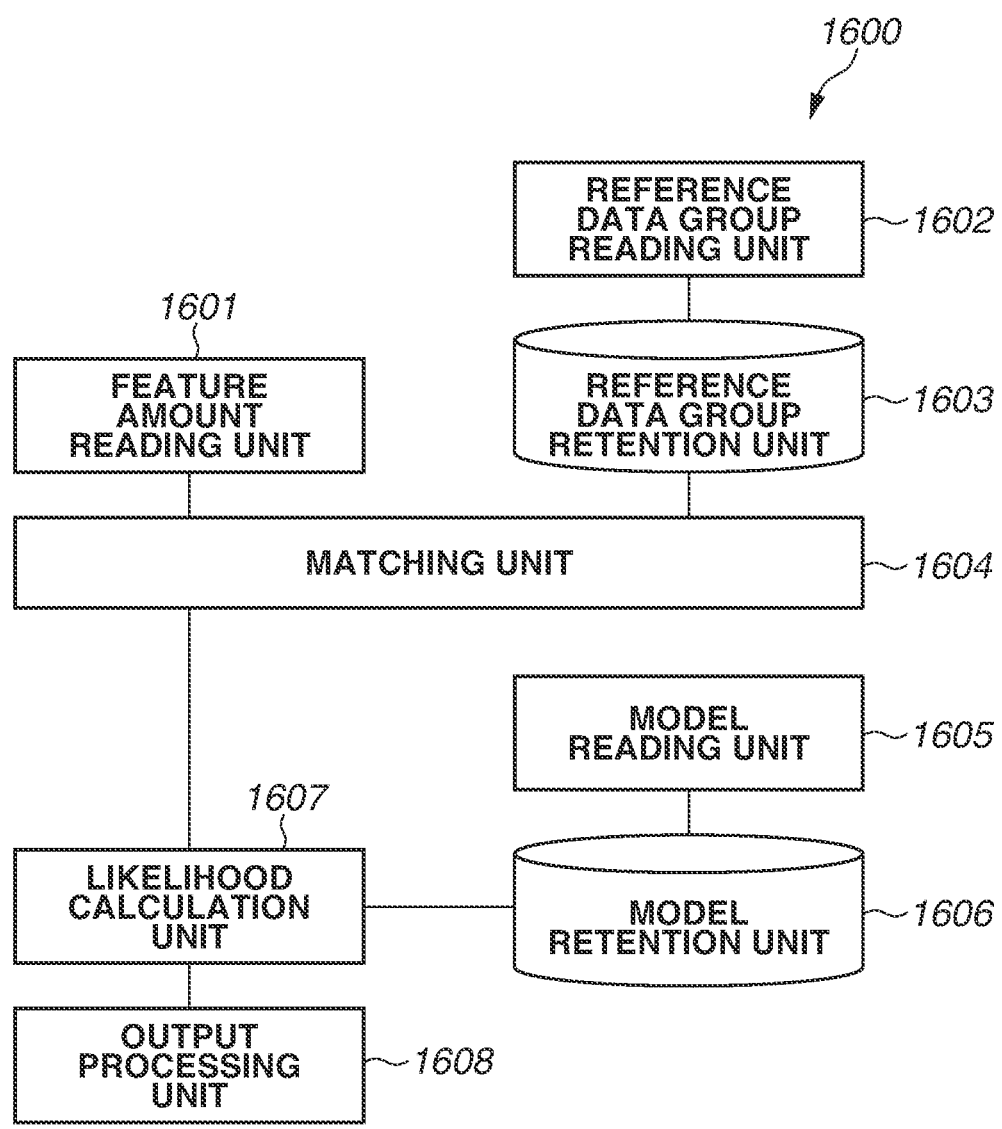
FIG. 16 is a diagram illustrating a processing unit that performs determination processing according to at least the fourth embodiment.
Figure 17:
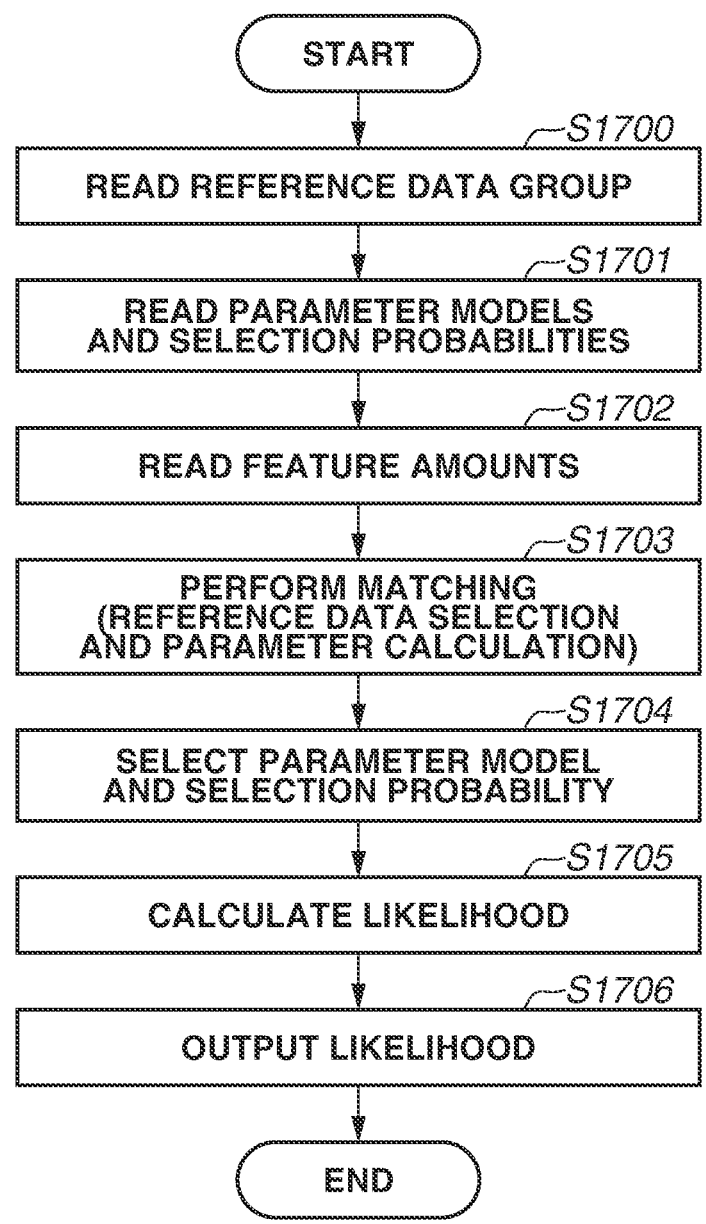
FIG. 17 is a flowchart illustrating the determination processing according to at least the fourth embodiment.

Next, determination processing according to the fourth exemplary embodiment is described. FIG. 16 is a diagram illustrating a software configuration of a processing unit 1600 for performing the determination processing according to the fourth exemplary embodiment. FIG. 17 is a flowchart illustrating the determination processing according to the fourth exemplary embodiment. As illustrated in FIG. 16, the processing unit 1600 includes a feature amount reading unit 1601, a reference data group reading unit 1602, a reference data group retention unit 1603, and a matching unit 1604. The processing unit 1600 further includes a model reading unit 1605, a model retention unit 1606, a likelihood calculation unit 1607, and an output processing unit 1608. The function of each unit is also described with reference to FIG. 17.

In step S1700, the reference data group reading unit 1602 acquires a reference data group and records the reference data group into the reference data group retention unit 1603. The present processing is similar to the processing in step S1501 illustrated in FIG. 15. In step S1700, the reference data group reading unit 1602 also reads 30 pieces of reference data as those read in step S1501. Next, in step S1701, the model reading unit 1605 reads a plurality of parameter models and a plurality of selection probabilities corresponding to respective pieces of reference data generated in the model generation processing into the model retention unit 1606. As mentioned above, since, in the present exemplary embodiment, 30 pieces of reference data are used, 30 parameter models and 30 selection probabilities are read.

Next, in step S1702, the feature amount reading unit 1601 acquires a moving image targeted for determination. Then, the feature amount reading unit 1601 extracts a VCS feature from the acquired moving image in a manner similar to that described in the model generation processing, and sends the extracted VCS feature to the matching unit 1604. Next, in step S1703, the matching unit 1604 selects reference data with respect to the VCS feature, and calculates a similarity between the VCS feature and the selected reference data. The matching unit 1604 further calculates a correlation value. The present processing is similar to the processing performed by the matching unit 1405 in step S1503. The matching unit 1604 sends the selected reference data, the similarity about the selected reference data, and the correlation value as a matching result to the likelihood calculation unit 1607.

Next, in steps S1704 and S1705, the likelihood calculation unit 1607 calculates a likelihood based on the matching result received from the matching unit 1604 and the parameter model and selection probability recorded on the model retention unit 1606. More specifically, in step S1704, the likelihood calculation unit 1607 first selects a parameter model and a selection probability corresponding to the selected reference data from the model retention unit 1606 based on a number of the selected reference data included in the matching result. For example, suppose that the selected reference data indicated by the matching result obtained in step S1703 is the i-th reference data. In this case, the likelihood calculation unit 1607 selects a parameter model corresponding to the i-th reference data and a selection probability of the i-th reference data from the model retention unit 1606.

Then, in step S1705, the likelihood calculation unit 1607 calculates a likelihood L based on the selected parameter model and selection probability according to formula (15).

$$L = \frac{p_{(i)}}{2\pi |\Sigma_{(i)}|^{1/2}} \exp\left\{-\frac{1}{2}(z_{(i)} - \mu_{(i)})^T \Sigma_{(i)}^{-1} (z_{(i)} - \mu_{(i)})\right\} \quad (15)$$

In formula (15), $p_{(i)}$ is the selection probability of the i-th reference data, $z_{(i)}$ is a two-dimensional vector obtained by arranging similarities and correlation values in the matching result obtained from the VCS feature targeted for determination. $\mu_{(i)}$ and $\Sigma_{(i)}$ are an average and a variance-covariance matrix of the distribution, respectively, and are the ones calculated in the above-mentioned model generation processing. The calculated likelihood L is sent to the output processing unit 1608.

Next, in step S1706, the output processing unit 1608 performs control to output the likelihood L to the outside. Thus, the determination processing is completed. When the likelihood output by the above processing is used and is, for example, equal to or greater than a previously-determined threshold value, it can be determined that there is a high possibility of being a specific scene subjected to modeling.

In this way, the information processing apparatus 100 is able to perform processing for determining whether data is a moving image of a specific scene. Moreover, the information processing apparatus 100 is able to not only use a parameter model concerning reference data but also concurrently use a model of selection probability of the reference data to generate a more appropriate model and to perform more appropriate determination. As described above, the information processing apparatus 100 according to the fourth exemplary embodiment is able to generate models of a specific scene in a system which detects a specific scene from a moving image captured by, for example, a video camera. Moreover, the information processing apparatus 100 is able to determine whether an input scene is a specific scene using the generated models.

Furthermore, for a first modification example of the fourth exemplary embodiment, data targeted for model generation and determination by the information processing apparatus 100 only needs to be data available for selection of reference data and calculation of parameters pertaining to the reference data. In other words, the format of data is not limited to a still image and a moving image. Examples of data targeted for processing include sound data, other multimedia data, and text data.

Moreover, for a second modification example, while the information processing apparatus 100 according to the fourth exemplary embodiment calculates the product of values calculated by using models and selection probabilities concerning reference data as a likelihood, the method for calculating a likelihood is not limited to that described in the present exemplary embodiment. For another example, the information processing apparatus 100 can calculate a likelihood based on, for example, the sum of two values.

Furthermore, for a third modification example, the information processing apparatus 100 according to the fourth exemplary embodiment performs selection of reference data based on only a similarity and performs generation of a model using the similarity and a correlation value. However, the number and type of parameters to which the information processing apparatus 100 refers are not limited to those described in the present exemplary embodiment. For example, the information processing apparatus 100 can perform selection of reference data based on not only the similarity but also the correlation value. Moreover, for example, the information processing apparatus 100 can perform generation of a model based on only the similarity. Additionally, for example, the information processing apparatus 100 can perform generation of a model based on only the correlation value. Besides, for example, the information processing apparatus 100 can obtain a third parameter different from the similarity and the correlation value and generate a three-dimensional model using the similarity, the correlation value, and the third parameter. In this way, the information processing apparatus 100 can obtain a plurality of evaluation values, select reference data based on at least one evaluation value among the plurality of evaluation values, and perform model generation based on at least one evaluation value equal to or different from the evaluation value used for selection of the reference data.

Additionally, for a fourth modification example, while the information processing apparatus 100 according to the fourth exemplary embodiment selects reference data based on the similarity S, instead, the information processing apparatus 100 can select reference data by processing of what is called sparse coding, as in the first to third exemplary embodiments. On the other hand, the information processing apparatus 100 according to each of the first to third exemplary embodiments can select reference data by processing other than the processing of sparse coding, such as by using similarities. In this way, the information processing apparatus 100 only needs to select reference data according to a degree of conformity between a VCS feature and reference data, and the processing for such selection is not limited to that described in the present exemplary embodiment.

Furthermore, for a fifth modification example, while, in the fourth exemplary embodiment, the matching unit 1604 selects one piece of reference data with the highest similarity, the number of pieces of reference data to be selected is not limited to one. For example, as in the first exemplary embodiment, the matching unit 1604 can select a plurality of pieces of reference data such as select pieces of reference data with the top two high similarities.

Moreover, modification examples of each of the first to third exemplary embodiments are described. For a first modification example, as the information processing apparatus 100 according to the fourth exemplary embodiment calculates a similarity and a correlation value with respect to one piece of reference data, the information processing apparatus 100 according to each of the first to third exemplary embodiments can also calculate a plurality of parameters with respect to one piece of reference data and generate a model using these parameters.

Furthermore, for a second modification example, the information processing apparatus 100 according to each of the first to third exemplary embodiments can also generate a model about characteristic information on a normal patch acquired from the normal patch, such as a feature amount of the normal patch, as described in the fourth exemplary embodiment. Moreover, in this case, the information processing apparatus 100 according to each exemplary embodiment can perform determination using such a model.

Furthermore, for a third modification example, as the information processing apparatus 100 according to the fourth exemplary embodiment calculates a selection probability for reference data, the information processing apparatus 100 according to each of the first to third exemplary embodiments can concurrently use the selection probability in the model generation processing and the determination processing.

Next, with regard to an information processing apparatus 100 according to a fifth exemplary embodiment, portions different from those in the information processing apparatus 100 according to the other exemplary embodiments are described. As with the first to third exemplary embodiments, the information processing apparatus 100 according to the fifth exemplary embodiment uses models generated in the model generation process to perform processing for calculating a likelihood of an inspection patch clipped from an inspection image. While, in the first to third exemplary embodiments, a case in which the technique of sparse coding is used for encoding of an inspection patch is described, the present exemplary embodiment uses an auto-encoder described in the following literature for encoding of an inspection patch.

Yoshua Bengio, Pascal Lamblin, Dan Popovici, and Hugo Larochelle, "Greedy Layer-Wise Training of Deep Networks", Advances in Neural Information Processing Systems 19, pp. 153-160, 2007

Figure 18:
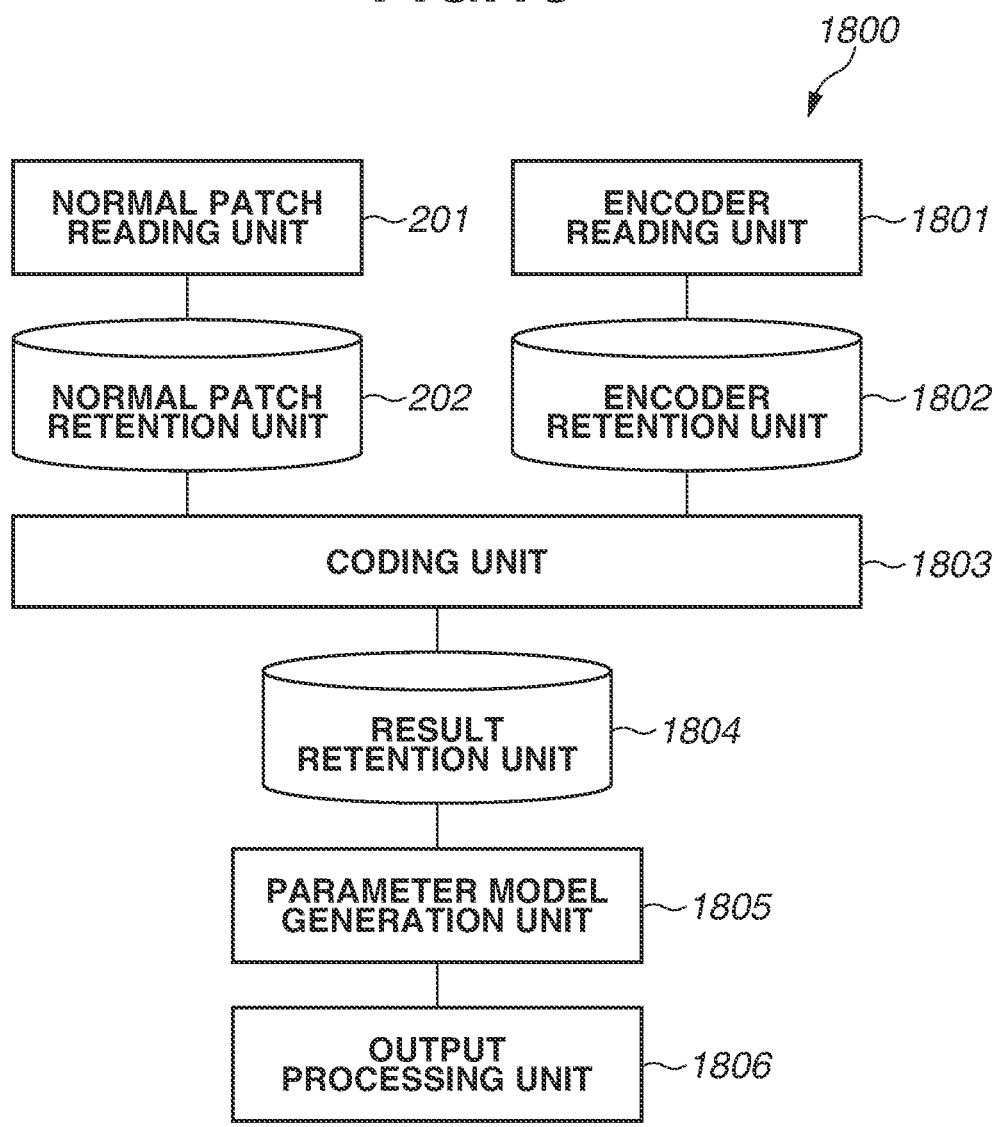
FIG. 18 is a diagram illustrating a processing unit that performs model generation processing according to at least a fifth embodiment.
Figure 19:
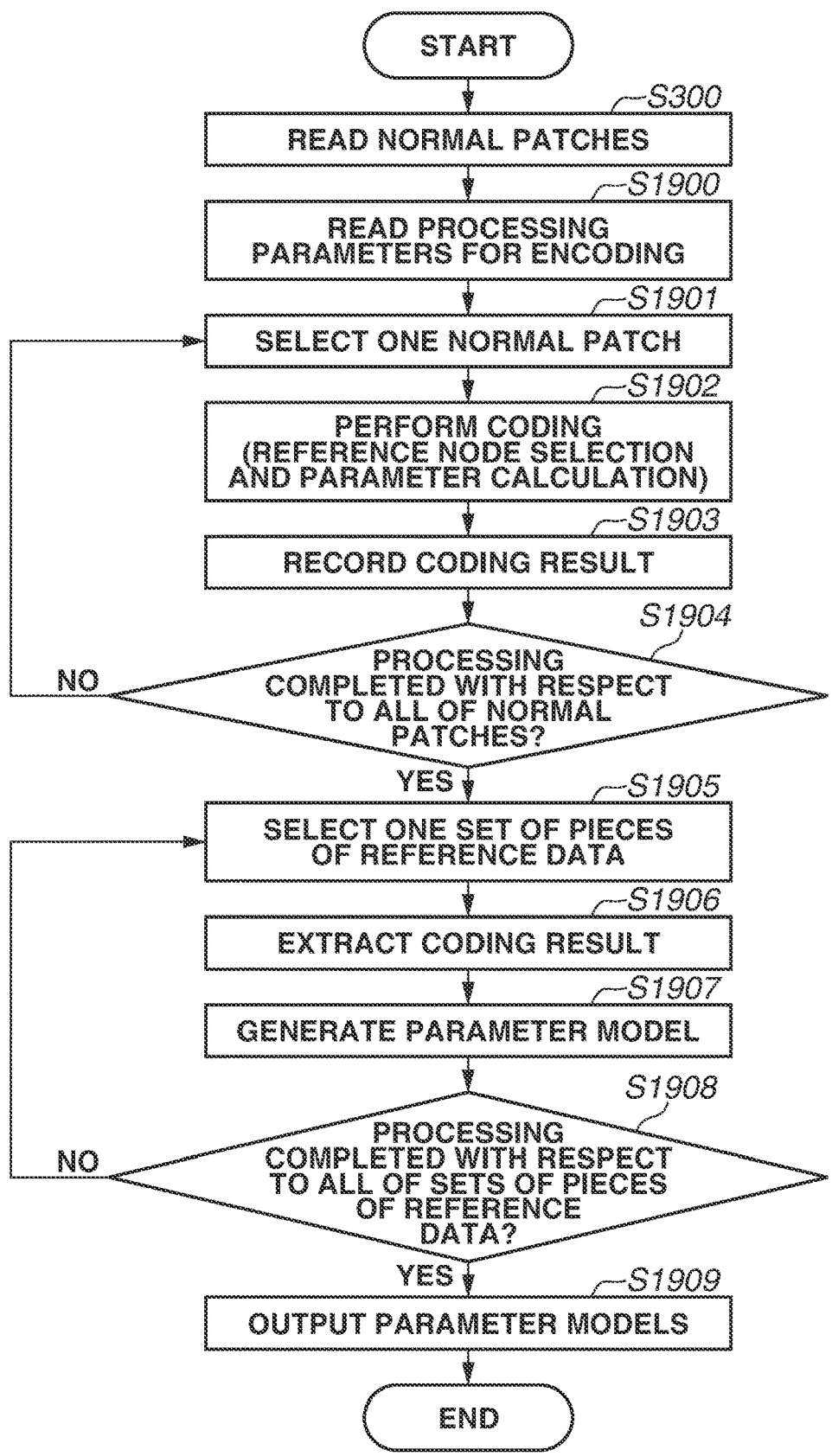
FIG. 19 is a flowchart illustrating the model generation processing according to at least the fifth embodiment.

Processing performed by the information processing apparatus 100 according to the fifth exemplary embodiment is also broadly divided into a model generation process and a determination process as with the processing performed by the information processing apparatus 100 according to the other exemplary embodiments. First, model generation processing in the model generation process is described. FIG. 18 is a diagram illustrating a software configuration of a processing unit 1800 for performing model generation processing according to the fifth exemplary embodiment. The same functions as the functions of the processing unit 200 illustrated in FIG. 2 are assigned the respective same reference characters. FIG. 19 is a flowchart illustrating the model generation processing according to the fifth exemplary embodiment. The same processing operations as the processing operations included in the model generation processing illustrated in FIG. 3 are assigned the respective same reference characters.

As illustrated in FIG. 18, as with the processing unit 200, the processing unit 1800 includes a normal patch reading unit 201 and a normal patch retention unit 202. The processing unit 1800 further includes an encoder reading unit 1801, an encoder retention unit 1802, a coding unit 1803, a result retention unit 1804, a parameter model generation unit 1805, and an output processing unit 1806. The function of each unit is also described with reference to FIG. 19.

Figure 22:
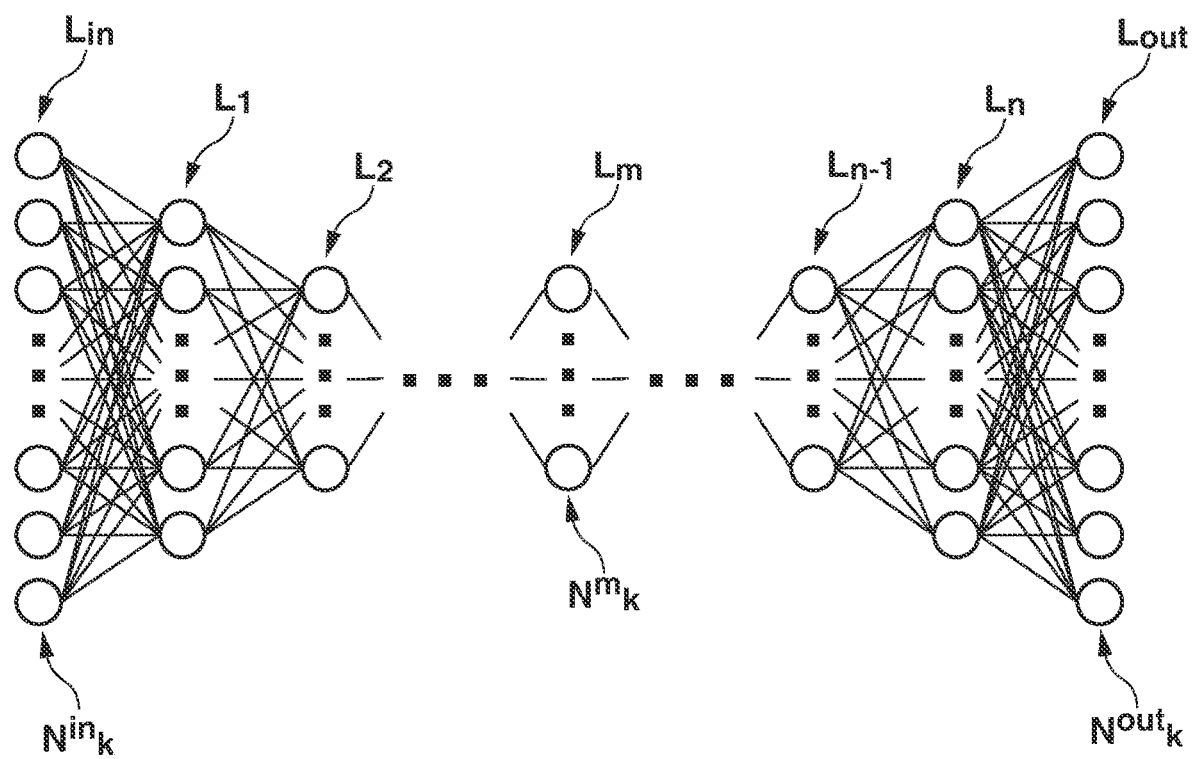
FIG. 22 is a schematic diagram illustrating at least one embodiment of a structure of hierarchical processing.

As illustrated in FIG. 19, after processing in step S300, the CPU 101 advances the processing to step S1900. In step S1900, the encoder reading unit 1801 reads processing parameters for encoding to be used in the coding unit 1803 into the encoder retention unit 1802. Here, the processing parameters for encoding includes a parameter indicating a network structure of the auto-encoder described in the above literature and a weight coupling parameter. In the present exemplary embodiment, the auto-encoder to be used is an auto-encoder which has previously performed learning using a great number of normal patches. The auto-encoder used in the present exemplary embodiment has a network structure configured of a plurality of layers $L_{in}$ to $L_{out}$ as illustrated in FIG. 22, and performs encoding and decoding of an input patch by hierarchical processing. The layers $L_{in}$ and $L_{out}$ have nodes $N^{in}_k$ and nodes $N^{out}_k$ (k=1, 2, ..., 64), respectively, the number of each of which is equal to the number of pixels of a normal patch, which is input data (in the present exemplary embodiment, 8×8=64 nodes). The auto-encoder inputs data about a normal patch to the layer $L_{in}$ and performs encoding by performing hierarchical processing in the order of $L_1, L_2, \ldots, L_m$. Thus, each output value of the node $N^m_k$ of the layer $L_m$ is treated as an encoding result of a normal patch input to the layer $L_{in}$. Hereinafter, in the present exemplary embodiment, the layer $L_m$ is referred to as an "encoding layer", and a plurality of nodes configuring the encoding layer $L_m$ is referred to as "reference nodes". Decoding is performed by performing hierarchical processing in the order of $L_m, \ldots, L_{n-1}, L_n, L_{out}$, and a decoding result of a normal patch input to the layer $L_{in}$ is obtained as an output value of each node of the layer $L_{out}$.

Next, in step S1901, the coding unit 1803 selects one normal patch as a processing target from among a plurality of normal patches recorded on the normal patch retention unit 202. Furthermore, processing in steps S1901 to S1904 is repetitive processing, and, during repetition, all of the normal patches stored in the normal patch retention unit 202 only need to be selected one by one, so that the order of selection thereof is not specifically limited.

Next, in step S1902, the coding unit 1803 performs processing by the auto-encoder with respect to the normal patch selected as a processing target, and selects a previously-set number of reference nodes from among a plurality of reference nodes configuring the encoding layer $L_m$, according to a method described below. Moreover, the coding unit 1803 specifies parameters about the respective selected reference nodes. Here, the parameter is an output value of the reference node. With regard to selection of reference nodes, in the present exemplary embodiment, the top two reference nodes with high output values are selected from among all of the reference nodes. While, in the present exemplary embodiment, in this way, top reference nodes with high output values are selected, the present exemplary embodiment is not limited to this, but, for example, another method, such as a method of selecting top reference nodes with the smallest error from a predetermined value previously determined for each reference node, can be used for selection.

Next, in step S1903, the coding unit 1803 records the reference nodes selected in step S1902 and the output values of the selected reference nodes as a coding result subjected to sampling on the result retention unit 1804. Thus, the coding unit 1803 records, on the result retention unit 1804, only pieces of information about reference nodes selected by a predetermined method, among outputs of all of the reference nodes of the encoding layer $L_m$ serving as a coding result. In the present exemplary embodiment, since two reference nodes are selected, for example, suppose that the i-th and j-th reference nodes are selected and the respective output values corresponding to these reference nodes are $O_i$ and $O_j$. In this case, the coding unit 1803 records a data set $(i, j, O_i, O_j)$, which is obtained by putting together these pieces of information, as a coding result subjected to sampling on the result retention unit 1804.

Next, in step S1904, the coding unit 1803 checks whether processing in steps S1902 and S1903 has been completed with respect to all of the normal patches recorded on the normal patch retention unit 202. If there is any unprocessed normal patch (NO in step S1904), the coding unit 1803 returns the processing to step S1901. In this instance, the coding unit 1803 selects an unprocessed normal patch in step S1901 and performs processing in step S1902 and subsequent steps. If processing in steps S1902 and S1903 has been completed with respect to all of the normal patches (YES in step S1904), the coding unit 1803 advances the processing to step S1905. When the processing has been completed with respect to all of the normal patches, respective coding results subjected to sampling corresponding to all of the normal patches recorded on the normal patch retention unit 202 are recorded on the result retention unit 1804.

In subsequent steps S1905 to S1909, the parameter model generation unit 1805 generates a plurality of parameter models using a great number of coding results subjected to sampling recorded on the result retention unit 1804, and the output processing unit 1806 outputs all of the generated parameter models. This processing is similar to processing performed in a case where the output value $O_i$ of the selected i-th reference node is replaced by the weight coefficient $w_{(i)}$ corresponding to the selected i-th reference data in the first exemplary embodiment, and is, therefore, omitted from description. With processing in steps S1905 to S1909 performed, a plurality of parameter models is output, so that the model generation processing in the present exemplary embodiment is completed.

Figure 20:
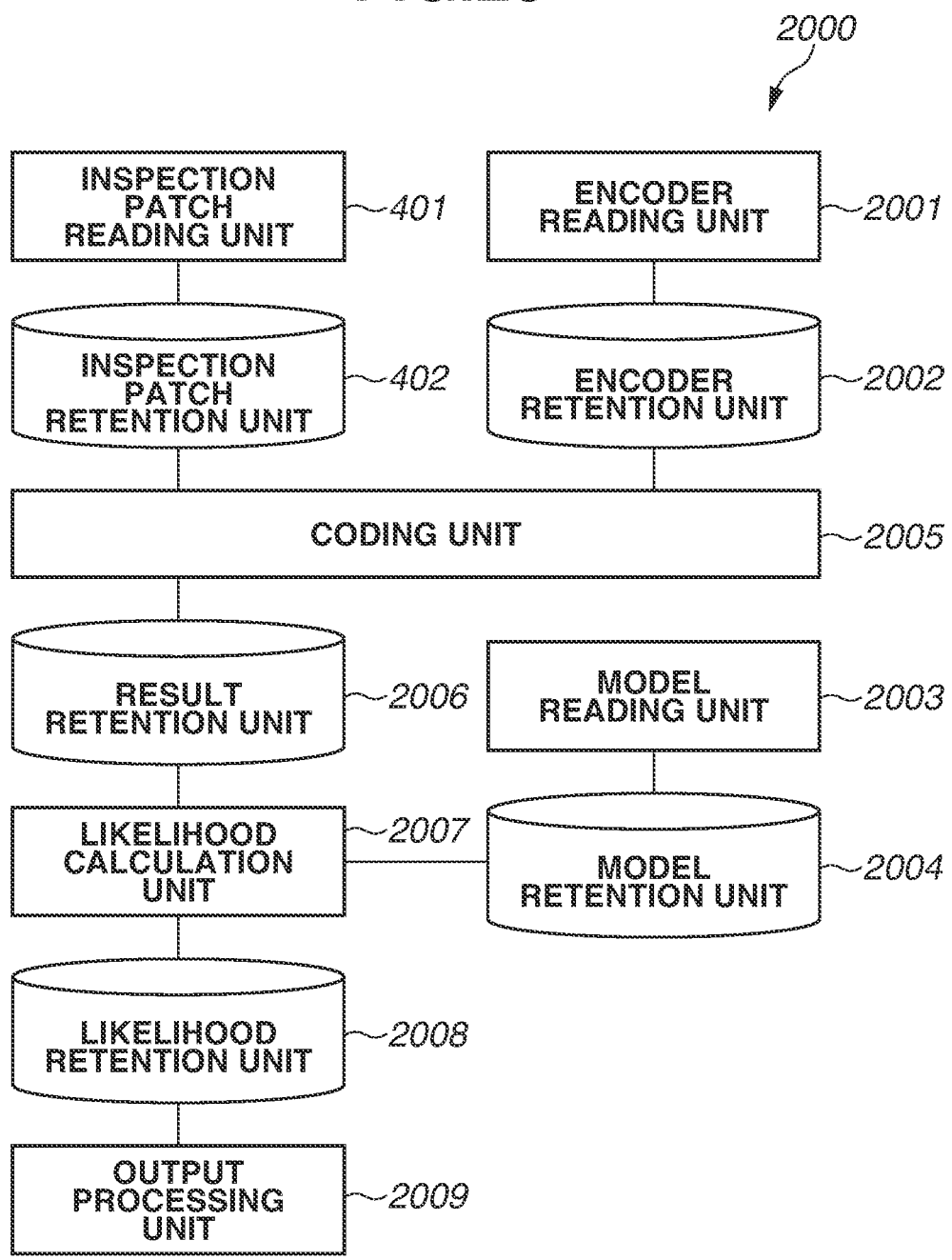
FIG. 20 is a diagram illustrating a processing unit that performs determination processing according to at least the fifth embodiment.
Figure 21:
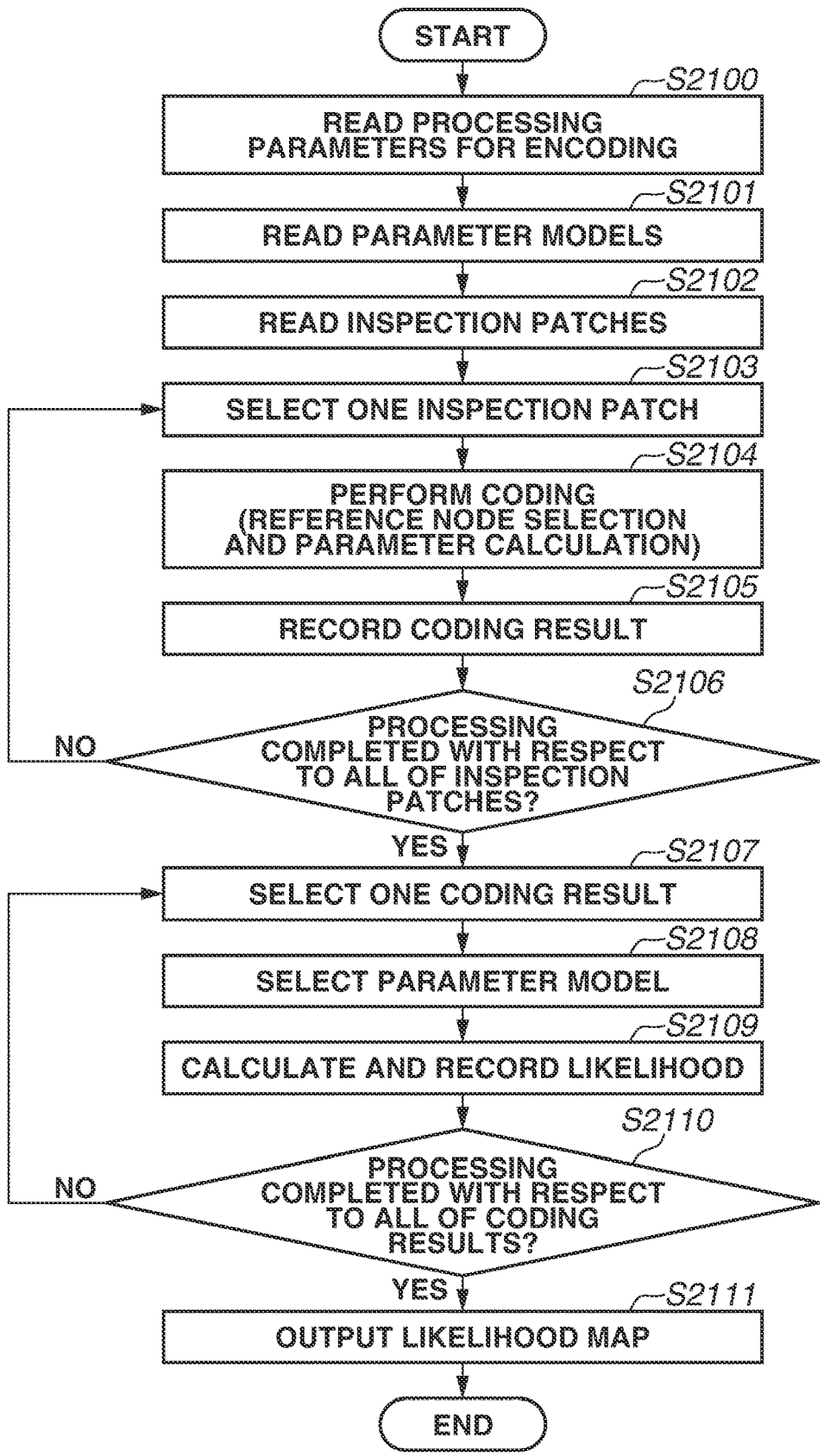
FIG. 21 is a flowchart illustrating the determination processing according to at least the fifth embodiment.

Next, processing in the determination process performed by the information processing apparatus 100 according to the fifth exemplary embodiment is described. FIG. 20 is a diagram illustrating a software configuration of a processing unit 2000 for performing the determination processing by the information processing apparatus 100. Out of the functions of the processing unit 2000, the same functions as the functions of the processing unit 400 illustrated in FIG. 4 are assigned the respective same reference characters. FIG. 21 is a flowchart illustrating the determination processing according to the fifth exemplary embodiment.

As illustrated in FIG. 20, as with the processing unit 400, the processing unit 2000 includes an inspection patch reading unit 401 and an inspection patch retention unit 402. The processing unit 2000 further includes an encoder reading unit 2001, an encoder retention unit 2002, a model reading unit 2003, a model retention unit 2004, a coding unit 2005, a result retention unit 2006, a likelihood calculation unit 2007, a likelihood retention unit 2008, and an output processing unit 2009. The function of each unit is also described along with the determination processing (FIG. 21).

In step S2100 illustrated in FIG. 21, the encoder reading unit 2001 acquires processing parameters for encoding and reads the processing parameters for encoding into the encoder retention unit 2002. Furthermore, the processing parameters for encoding to be read into the encoder retention unit 2002 are the same as the processing parameters to be read into the encoder retention unit 1802 in step S1900 of the model generation processing (FIG. 19). Next, in step S2101, the model reading unit 2003 acquires all of the parameter models generated in the model generation processing and reads them into the model retention unit 2004.

Next, in step S2102, as in the first exemplary embodiment, the inspection patch reading unit 401 generates a plurality of inspection patches from an inspection image and reads the inspection images into the inspection patch retention unit 402.

Processing in subsequent steps S2103 to S2106 is processing approximately similar to the processing in steps S1901 to S1904 in the model generation processing. In step S2103, the coding unit 2005 selects one inspection patch as a processing target from among a plurality of inspection patches recorded on the inspection patch retention unit 402. Furthermore, processing in steps S2103 to S2106 is repetitive processing, and, during repetition, all of the inspection patches recorded on the inspection patch retention unit 402 only need to be selected one by one, so that the order of selection thereof is not specifically limited.

Next, in step S2104, the coding unit 2005 performs processing by the auto-encoder with respect to the inspection patch selected as a processing target in step S2103, and selects the top two reference nodes with high output values from among a plurality of reference nodes configuring the encoding layer $L_m$. Moreover, the coding unit 2005 specifies parameters about the respective selected reference nodes, i.e., the output values of the corresponding reference nodes. Furthermore, processing for coding in step S2104 is similar to the processing for coding in step S1902, and is encoding and decoding processing by the auto-encoder.

Next, in step S2105, the coding unit 2005 records the reference nodes selected in step S2104, the output values corresponding to the selected reference nodes, and the position of the inspection patch as a coding result subjected to sampling on the result retention unit 2006. The position of the inspection patch is similar to that described in the first exemplary embodiment. Suppose that an inspection patch clipped from the position (x, y) of the inspection image is selected as a processing target and the i-th and j-th reference nodes are selected with respect to the selected inspection patch. Moreover, suppose that the respective output values corresponding to the selected reference nodes are $o_i$ and $o_j$. In this case, the coding unit 2005 records a data set (x, y, i, j, $o_i$, $o_j$) as a coding result subjected to sampling on the result retention unit 2006.

Next, in step S2106, the coding unit 2005 checks whether processing in steps S2104 and S2105 has been completed with respect to all of the inspection patches recorded on the inspection patch retention unit 402. If there is any unprocessed inspection patch (NO in step S2106), the coding unit 2005 returns the processing to step S2103. In this instance, the coding unit 2005 selects an unprocessed inspection patch in step S2103 and performs processing in step S2104 and subsequent steps. If processing in steps S2104 and S2105 has been completed with respect to all of the inspection patches (YES in step S2106), the coding unit 2005 advances the processing to step S2107. When the processing has been completed with respect to all of the inspection patches, respective coding results subjected to sampling corresponding to all of the inspection patches recorded on the inspection patch retention unit 402 are recorded on the result retention unit 2006.

In subsequent steps S2107 to S2111, the likelihood calculation unit 2007 calculates likelihoods of the inspection patches corresponding to all of the coding results subjected to sampling recorded on the result retention unit 2006 using a great number of parameter models recorded on the model retention unit 2004. Here, the likelihood to be calculated is the probability of being a normal patch as in the first exemplary embodiment. The likelihood calculation unit 2007 records the calculated likelihood together with the position information (x, y) about the inspection patch on the likelihood retention unit 2008. As in the first exemplary embodiment, the output processing unit 2009 generates a likelihood map based on the likelihood information recorded on the likelihood retention unit 2008, and performs control to output the generated likelihood map. This processing is similar to processing performed in a case where the output value $O_i$ of the selected i-th reference node is replaced by the weight coefficient $w_{(i)}$ corresponding to the selected i-th reference data in the first exemplary embodiment, and is, therefore, omitted from description. With processing in steps S2107 to S2111 performed, an image in which the likelihoods obtained for the respective inspection patches are arranged as pixel values corresponding to the clipping positions of the respective inspection patches is generated as a likelihood map, so that the determination processing in the present exemplary embodiment is completed. The determination using the generated likelihood map can be similar to that described in the first exemplary embodiment, and is, therefore, omitted from description.

As described above, one or more features of the present disclosure can also be applied to a case in which hierarchical processing is performed on data. While, in the present embodiment, an example of using an auto-encoder to perform hierarchical processing is described, the present invention is not limited to this, but can also be applied to a case in which, for example, hierarchical processing using convolutional neural networks (CNNs) described in the following literature is performed.

Alex Krizhevsky, Ilya Sutskever, and Geoffrey E. Hinton, "ImageNet Classification with Deep Convolutional Neural Networks", Advances in Neural Information Processing Systems 25, pp. 1106-1114, 2012

Furthermore, while, in the present exemplary embodiment, nodes configuring one predetermined layer in the network structure for hierarchical processing are set as reference nodes, a configuration in which reference nodes extend over a plurality of layers can be employed.

While various embodiments have been described above in detail, the present invention is not limited to the described specific embodiments, but can be modified or changed in various manners within the scope of the gist of the present invention set forth in the claims.

According to embodiments of the present disclosure, a more appropriate model for evaluating the category of data can be generated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-015590 filed Jan. 31, 2017, which is hereby incorporated by reference herein in its entirety.

What is claimed is:

1. A model generation apparatus that generates a model representing a feature of specific data belonging to a specific category, the model generation apparatus comprising:
one or more processors that operate to:
select, based on a degree of conformity between each of a plurality of pieces of specific data belonging to the specific category and each of a plurality of pieces of reference data included in a previously-set reference data group, at least one piece of reference data from the reference data group with respect to each piece of specific data;
specify at least one parameter corresponding to the at least one piece of the reference data selected by the one or more processors with respect to each of the plurality of pieces of specific data; and
generate, as a model of the specific data, a parameter model indicating a distribution of the at least one parameter specified by the one or more processors.

2. The model generation apparatus according to claim 1, wherein the one or more processors further operate to extract, with respect to each of a plurality of sets corresponding to predetermined m, where m is an integer of or more, pieces of reference data of the plurality of pieces of reference data included in the reference data group, where respective combinations of the m pieces of reference data of the plurality of sets are different from each other, a selection result including the m pieces of reference data pertaining to each set from among selection results of pieces of reference data with respect to each piece of specific data by the one or more processors, and
wherein the one or more processors generate, as models of the specific data, a plurality of parameter models each corresponding to the parameter model and indicating a distribution of m parameters corresponding to the m pieces of reference data pertaining to each of the plurality of sets using parameters corresponding to the selection result extracted with respect to each of the plurality of sets.

3. The model generation apparatus according to claim 2, wherein the one or more processors generate, as the parameter model, a model indicating a distribution of a sum of absolute values of the parameters respectively corresponding to the m pieces of reference data.

4. The model generation apparatus according to claim 2, wherein the one or more processors generate, as the parameter model, a model indicating a distribution concerning a direction of a vector in which the parameters respectively corresponding to the m pieces of reference data are arranged.

5. The model generation apparatus according to claim 1, wherein the one or more processors further operate to extract a selection result including each piece of reference data included in the reference data group from among selection results of pieces of reference data with respect to each piece of specific data by the one or more processors, and
wherein the one or more processors generate, as models of the specific data, a plurality of parameter models each corresponding to the parameter model and respectively corresponding to the plurality of pieces of reference data using parameters corresponding to the selection results respectively extracted with respect to the plurality of pieces of reference data.

6. The model generation apparatus according to claim 1, wherein the one or more processors select the reference data by processing of sparse coding using the reference data group, and
wherein the one or more processors specify, as the at least one parameter, a weight coefficient with respect to the reference data obtained by the processing of sparse coding.

7. The model generation apparatus according to claim 6, wherein the processing of sparse coding is processing for performing square error minimization with L0-norm regularization or processing for performing square error minimization with L1-norm regularization.

8. The model generation apparatus according to claim 1, wherein the one or more processors generate, as the parameter model, a model indicating a distribution of an absolute value of the at least one parameter.

9. The model generation apparatus according to claim 1, wherein the one or more processors further operate to specify an evaluation value indicating a degree of conformity between each of a plurality of pieces of specific data and each of a plurality of pieces of reference data included in the reference data group,
wherein the one or more processors select the reference data based on the evaluation value, and
wherein the one or more processors specify the evaluation value as the at least one parameter.

10. The model generation apparatus according to claim 9, wherein the one or more processors specify a plurality of evaluation values different from each other indicating degrees of conformity between a respective plurality of pieces of specific data and a respective plurality of pieces of reference data,
wherein the one or more processors select the reference data based on at least one evaluation value of the plurality of evaluation values, and
wherein the one or more processors specify, as the at least one parameter, at least one evaluation value of the plurality of evaluation values.

11. The model generation apparatus according to claim 1, wherein the one or more processors further operate to:
specify a displacement of each piece of specific data from the parameter model corresponding thereto;
classify, based on an attribute available to classify a plurality of pieces of specific data, the plurality of pieces of specific data into a plurality of groups, and
generate, as models of the specific data, a plurality of displacement models indicating distributions of displacements of the respective plurality of groups using displacements specified with respect to respective pieces of specific data of each of the plurality of groups.

12. The model generation apparatus according to claim 11,
wherein the specific data is a partial image included in an entire image, and
wherein the one or more processors classify the specific data into one of the plurality of groups based on an attribute of a position of the specific data in the entire image.

13. The model generation apparatus according to claim 1, wherein the one or more processors further generate, as a model of the specific data, a model of a selection probability that at least one piece of reference data to be selected by the one or more processors is selected by the one or more processors.

14. The model generation apparatus according to claim 1, wherein the one or more processors generate the parameter model with the distribution of the at least one parameter assumed to be a normal distribution.

15. An evaluation apparatus that calculates, using a model representing a feature of specific data belonging to a specific category, a likelihood that data targeted for determination belongs to a specific category and evaluates the data targeted for determination based on the likelihood, the evaluation apparatus comprising:
one or more processors that operate to:
select, based on a degree of conformity between target data targeted for determination and each of a plurality of pieces of reference data included in a previously-set reference data group, at least one piece of reference data from the reference data group;
specify at least one parameter corresponding to the at least one piece of the reference data selected by the one or more processors; and
calculate a likelihood that the target data belongs to a specific category based on a parameter model indicating a distribution in a plurality of pieces of specific data of the at least one parameter specified by the one or more processors as a model of the specific data.

16. The evaluation apparatus according to claim 15, wherein the one or more processors further operate to select a parameter model corresponding to the target data from among a plurality of parameter models each generated as a model of the specific data and indicating a distribution of m, where m is an integer of 2 or more, parameters, respective combinations of the m parameters pertaining to each parameter model being different from each other, based on the reference data selected by the one or more processors, and
wherein the one or more processors calculate a likelihood that the target data belongs to a specific category based on the parameter model selected by the one or more processors.

17. The evaluation apparatus according to claim 15, wherein the one or more processors further operate to select a parameter model corresponding to the target data from among a plurality of parameter models each generated as a model of the specific data and indicating a distribution of one parameter, based on the reference data selected by the one or more processors, and
wherein the one or more processors calculate a likelihood that the target data belongs to a specific category based on the parameter model selected by the one or more processors.

18. The evaluation apparatus according to claim 15, wherein the one or more processors further operate to:
specify a group to which the target data belongs based on an attribute available to classify a plurality of pieces of specific data;
select a displacement model of the group specified by the one or more processors from among a plurality of displacement models indicating displacements from the parameter model and generated for each group, and
calculate a likelihood that the target data belongs to a specific category based on the parameter model and the displacement model.

19. The evaluation apparatus according to claim 15, wherein the one or more processors further calculate a likelihood that the target data belongs to a specific category based on a selection probability previously set with respect to the reference data selected by the one or more processors.

20. A model generation apparatus that generates a model representing a feature of specific data belonging to a specific category, the model generation apparatus comprising:
one or more processors that operate to:
select, based on each of a plurality of pieces of specific data belonging to the specific category and each of output values of a plurality of reference nodes included in a previously-set hierarchical processor, at least one reference node from the plurality of reference nodes with respect to each piece of specific data;
specify at least one parameter corresponding to the at least one reference node selected by the one or more processors with respect to each of the plurality of pieces of specific data; and
generate, as a model of the specific data, a parameter model indicating a distribution of the at least one parameter specified by the one or more processors.

21. An evaluation apparatus that calculates, using a model representing a feature of specific data belonging to a specific category, a likelihood that data targeted for determination belongs to a specific category and evaluates the data targeted for determination based on the likelihood, the evaluation apparatus comprising:
one or more processors that operate to:
select, based on target data targeted for determination and each of output values of a plurality of reference nodes included in a previously-set hierarchical processor, at least one reference node from the plurality of reference nodes;
specify at least one parameter corresponding to the at least one reference node selected by the one or more processors; and
calculate a likelihood that the target data belongs to a specific category based on a parameter model indicating a distribution in a plurality of pieces of specific data of the at least one parameter specified by the one or more processors as a model of the specific data.

22. A model generation method performed by a model generation apparatus that generates a model representing a feature of specific data belonging to a specific category, the model generation method comprising:
selecting, based on a degree of conformity between each of a plurality of pieces of specific data belonging to the specific category and each of a plurality of pieces of reference data included in a previously-set reference data group, at least one piece of reference data from the reference data group with respect to each piece of specific data;
specifying at least one parameter corresponding to the selected at least one piece of the reference data with respect to each of the plurality of pieces of specific data; and
generating, as a model of the specific data, a parameter model indicating a distribution of the at least one specified parameter.

23. An evaluation method performed by an evaluation apparatus that calculates, using a model representing a feature of specific data belonging to a specific category, a likelihood that data targeted for determination belongs to a specific category and evaluates the data targeted for determination based on the likelihood, the evaluation method comprising:
selecting, based on a degree of conformity between target data targeted for determination and each of a plurality of pieces of reference data included in a previously-set reference data group, at least one piece of reference data from the reference data group;
specifying at least one parameter corresponding to the selected at least one piece of the reference data; and
calculating a likelihood that the target data belongs to a specific category based on a parameter model indicating a distribution in a plurality of pieces of specific data of the at least one specified parameter as a model of the specific data.

24. A model generation method performed by a model generation apparatus that generates a model representing a feature of specific data belonging to a specific category, the model generation method comprising:
selecting, based on each of a plurality of pieces of specific data belonging to the specific category and each of output values of a plurality of reference nodes calculated in a previously-set hierarchical processing process, at least one reference node from the plurality of reference nodes with respect to each piece of specific data;
specifying at least one parameter corresponding to the at least one selected reference node with respect to each of the plurality of pieces of specific data; and
generating, as a model of the specific data, a parameter model indicating a distribution of the at least one specified parameter.

25. An evaluation method performed by an evaluation apparatus that calculates, using a model representing a feature of specific data belonging to a specific category, a likelihood that data targeted for determination belongs to a specific category and evaluates the data targeted for determination based on the likelihood, the evaluation method comprising:
selecting, based on target data targeted for determination and each of output values of a plurality of reference nodes calculated in a previously-set hierarchical processing process, at least one reference node from the plurality of reference nodes;
specifying at least one parameter corresponding to the at least one selected reference node; and
calculating a likelihood that the target data belongs to a specific category based on a parameter model indicating a distribution in a plurality of pieces of specific data of the at least one specified parameter as a model of the specific data.

26. A non-transitory computer-readable storage medium storing computer-executable instructions that, when executed by a computer, cause the computer to perform each process of a model generation method performed by a model generation apparatus that generates a model representing a feature of specific data belonging to a specific category, the model generation method comprising:
selecting, based on a degree of conformity between each of a plurality of pieces of specific data belonging to the specific category and each of a plurality of pieces of reference data included in a previously-set reference data group, at least one piece of reference data from the reference data group with respect to each piece of specific data;
specifying at least one parameter corresponding to the at least one selected piece of the reference data with respect to each of the plurality of pieces of specific data; and
generating, as a model of the specific data, a parameter model indicating a distribution of the at least one specified parameter.

27. A non-transitory computer-readable storage medium storing computer-executable instructions that, when executed by a computer, cause the computer to perform each process of an evaluation method performed by an evaluation apparatus that calculates, using a model representing a feature of specific data belonging to a specific category, a likelihood that data targeted for determination belongs to a specific category and evaluates the data targeted for determination based on the likelihood, the evaluation method comprising:
selecting, based on a degree of conformity between target data targeted for determination and each of a plurality of pieces of reference data included in a previously-set reference data group, at least one piece of reference data from the reference data group;
specifying at least one parameter corresponding to the at least one selected piece of the reference data; and
calculating a likelihood that the target data belongs to a specific category based on a parameter model indicating a distribution in a plurality of pieces of specific data of the at least one specified parameter as a model of the specific data.

28. A non-transitory computer-readable storage medium storing computer-executable instructions that, when executed by a computer, cause the computer to perform each process of a model generation method performed by a model generation apparatus that generates a model representing a feature of specific data belonging to a specific category, the model generation method comprising:
selecting, based on each of a plurality of pieces of specific data belonging to the specific category and each of output values of a plurality of reference nodes calculated in a previously-set hierarchical processing process, at least one reference node from the plurality of reference nodes with respect to each piece of specific data;
specifying at least one parameter corresponding to the at least one selected reference node with respect to each of the plurality of pieces of specific data; and
generating, as a model of the specific data, a parameter model indicating a distribution of the at least one specified parameter.

29. A non-transitory computer-readable storage medium storing computer-executable instructions that, when executed by a computer, cause the computer to perform each process of an evaluation method performed by an evaluation apparatus that calculates, using a model representing a feature of specific data belonging to a specific category, a likelihood that data targeted for determination belongs to a specific category and evaluates the data targeted for determination based on the likelihood, the evaluation method comprising:
selecting, based on target data targeted for determination and each of output values of a plurality of reference nodes calculated in a previously-set hierarchical processing process, at least one reference node from the plurality of reference nodes;
specifying at least one parameter corresponding to the at least one selected reference node; and
calculating a likelihood that the target data belongs to a specific category based on a parameter model indicating a distribution in a plurality of pieces of specific data of the at least one specified parameter as a model of the specific data.

* * * * *